(12) United States Patent
Burnsed et al.

(10) Patent No.: US 11,410,419 B2
(45) Date of Patent: Aug. 9, 2022

(54) ENHANCED VISION SYSTEMS AND METHODS

(71) Applicant: EOTECH, LLC, Ann Arbor, MI (US)

(72) Inventors: Jon Burnsed, Tempe, AZ (US);
Stephen Styonavich, Tempe, AZ (US);
Michael Iosue, Tempe, AZ (US)

(73) Assignee: L3 TECHNOLOGIES, INC., Melbourne, FL (US)

( * ) Notice: Subject to any disclaimer, the term of this patent is extended or adjusted under 35 U.S.C. 154(b) by 867 days.

(21) Appl. No.: 16/319,446

(22) PCT Filed: May 4, 2017

(86) PCT No.: PCT/US2017/031151
§ 371 (c)(1),
(2) Date: Jan. 21, 2019

(87) PCT Pub. No.: WO2018/017177
PCT Pub. Date: Jan. 25, 2018

(65) Prior Publication Data
US 2020/0400944 A1    Dec. 24, 2020

Related U.S. Application Data

(60) Provisional application No. 62/365,028, filed on Jul. 21, 2016.

(51) Int. Cl.
*G09G 5/00* (2006.01)
*G06V 20/20* (2022.01)
(Continued)

(52) U.S. Cl.
CPC ........... *G06V 20/20* (2022.01); *G02B 23/12* (2013.01); *G02B 25/001* (2013.01);
(Continued)

(58) Field of Classification Search
CPC ...... G06V 20/20; G02B 23/12; G02B 25/001; G02B 27/0101; G02B 2027/013;
(Continued)

(56) References Cited

U.S. PATENT DOCUMENTS

2009/0254070 A1 * 10/2009 Tripathi .............. G02B 21/361
606/4
2010/0328508 A1    12/2010 Vignolle et al.
(Continued)

OTHER PUBLICATIONS

International Search Report and Written Opinion in related International Application No. PCT/US2017/031151, dated Jun. 23, 2017, 11 pages.
(Continued)

*Primary Examiner* — Thuy N Pardo
(74) *Attorney, Agent, or Firm* — Allen, Dyer, Doppelt + Gilchrist, P.A. Attorneys at Law

(57) ABSTRACT

An enhanced vision system includes a first optic subsystem and a transparent photodetector subsystem disposed within a common housing. The first optic subsystem may include passive devices such as simple or compound lenses, active devices such as low-light enhancing image intensifiers, or a combination of passive and active devices. The transparent photodetector subsystem receives the visible image exiting the first optic subsystem and converts a portion of the electromagnetic energy in the visible image to a signal communicated to image analysis circuitry. On a real-time or near real-time basis, the image analysis circuitry detects and identifies structures, objects, and/or individuals in the visible image. The image analysis circuitry provides an output that includes information regarding the structure, objects, and individuals to the system user contemporaneous with the system user viewing the visible image.

31 Claims, 16 Drawing Sheets

(51) Int. Cl.
- *G02B 23/12* (2006.01)
- *G02B 25/00* (2006.01)
- *G02B 27/01* (2006.01)
- *H04N 5/33* (2006.01)
- *H04N 5/225* (2006.01)
- *H04N 5/232* (2006.01)
- *F41G 1/38* (2006.01)
- *F41G 3/14* (2006.01)

(52) U.S. Cl.
CPC ....... *G02B 27/0101* (2013.01); *H04N 5/2257* (2013.01); *H04N 5/2258* (2013.01); *H04N 5/232939* (2018.08); *H04N 5/332* (2013.01); *F41G 1/38* (2013.01); *F41G 3/145* (2013.01); *G02B 2027/013* (2013.01); *G02B 2027/014* (2013.01); *G02B 2027/0138* (2013.01); *G02B 2027/0141* (2013.01); *G02B 2027/0147* (2013.01)

(58) Field of Classification Search
CPC ...... G02B 2027/0138; G02B 2027/014; G02B 2027/0141; G02B 2027/0147; H04N 5/2257; H04N 5/2258; H04N 5/232939; H04N 5/332; F41G 1/38; F41G 3/145
USPC ......... 345/8, 7, 690; 382/128; 359/265, 267; 348/164, 335
See application file for complete search history.

(56) References Cited

U.S. PATENT DOCUMENTS

| | | | |
|---|---|---|---|
| 2012/0195479 A1* | 8/2012 | Ellis | H04N 1/00204 382/128 |
| 2012/0218320 A1* | 8/2012 | Evanicky | G09G 3/006 345/690 |
| 2012/0236387 A1* | 9/2012 | Bugno | G02F 1/163 359/267 |
| 2013/0001406 A1 | 1/2013 | Volkel | |
| 2013/0188056 A1* | 7/2013 | Heimer | G01J 3/0294 348/164 |
| 2014/0036337 A1* | 2/2014 | Neuman | G02F 1/161 359/265 |
| 2015/0268464 A1* | 9/2015 | Ranalli | G02B 26/127 348/36 |
| 2016/0041266 A1 | 2/2016 | Smits | |
| 2016/0042522 A1* | 2/2016 | Wajs | G02B 17/0808 348/335 |
| 2016/0077711 A1 | 3/2016 | Jung et al. | |
| 2017/0026588 A1* | 1/2017 | Kester | G01N 21/3504 |
| 2017/0090195 A1* | 3/2017 | Kim | G02B 27/0093 |
| 2017/0099465 A1* | 4/2017 | Mullis | H04N 9/09 |
| 2018/0199012 A1* | 7/2018 | Harris | G02B 13/06 |
| 2018/0267282 A1* | 9/2018 | Kaufman | G01J 3/0294 |
| 2018/0294376 A1* | 10/2018 | Tian | H01L 27/14609 |
| 2019/0215496 A1* | 7/2019 | Mullis | H04N 9/093 |
| 2021/0063141 A1* | 3/2021 | Venkataraman | G06T 7/521 |

OTHER PUBLICATIONS

International Preliminary Report on Patentability in related International Application No. PCT/US2017/031151, dated Jan. 31, 2019, 7 pages.

* cited by examiner

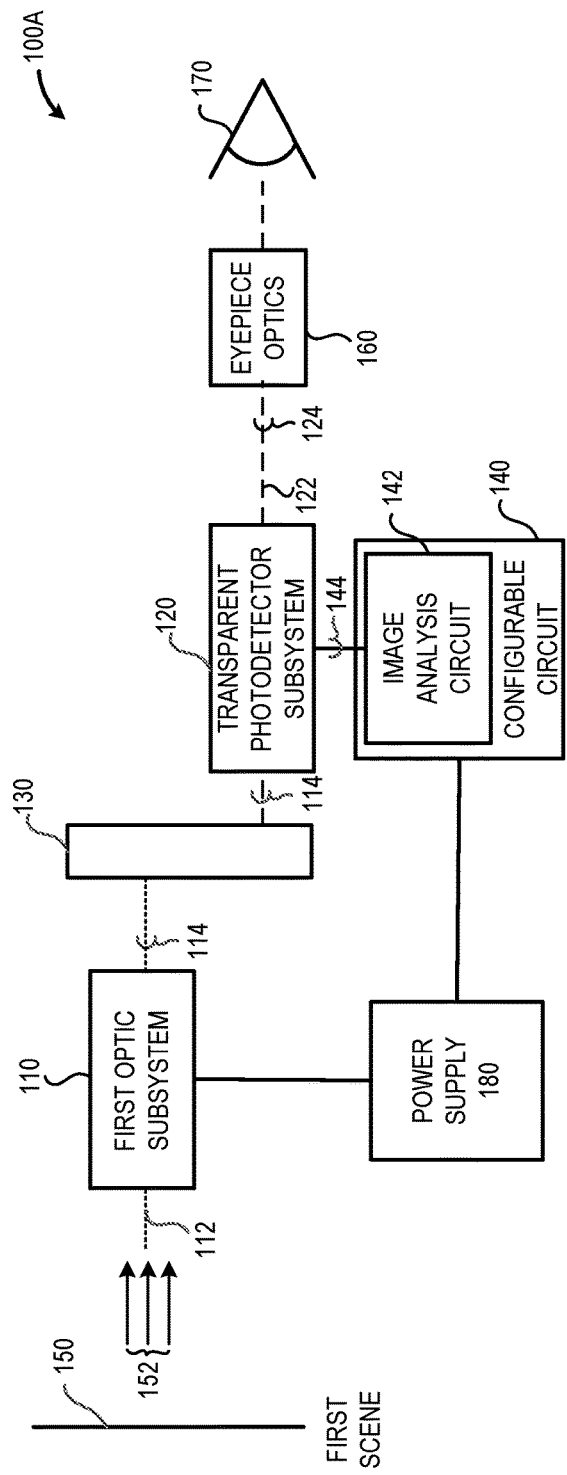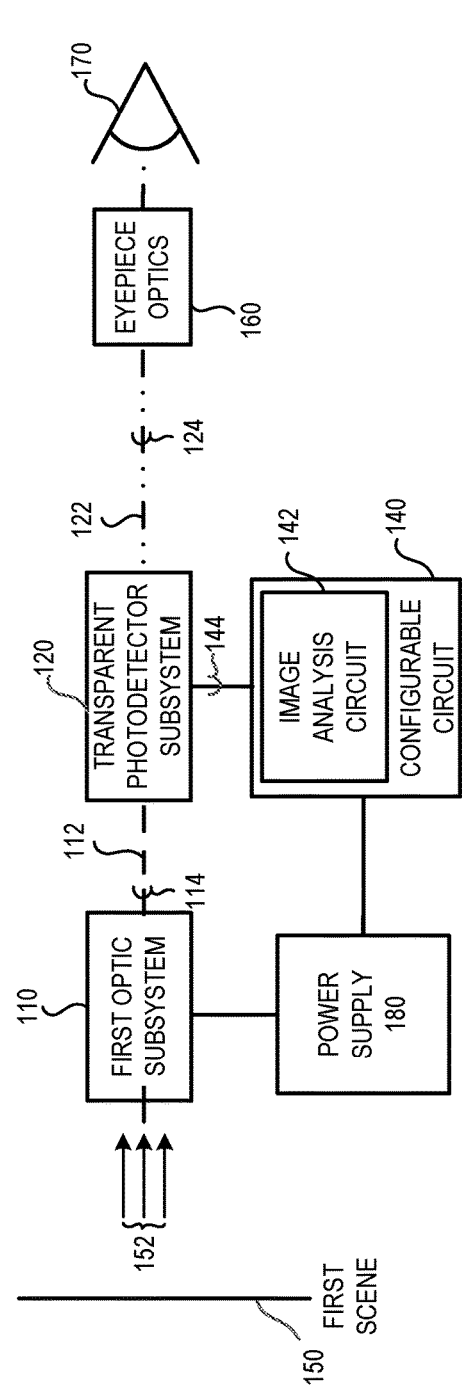

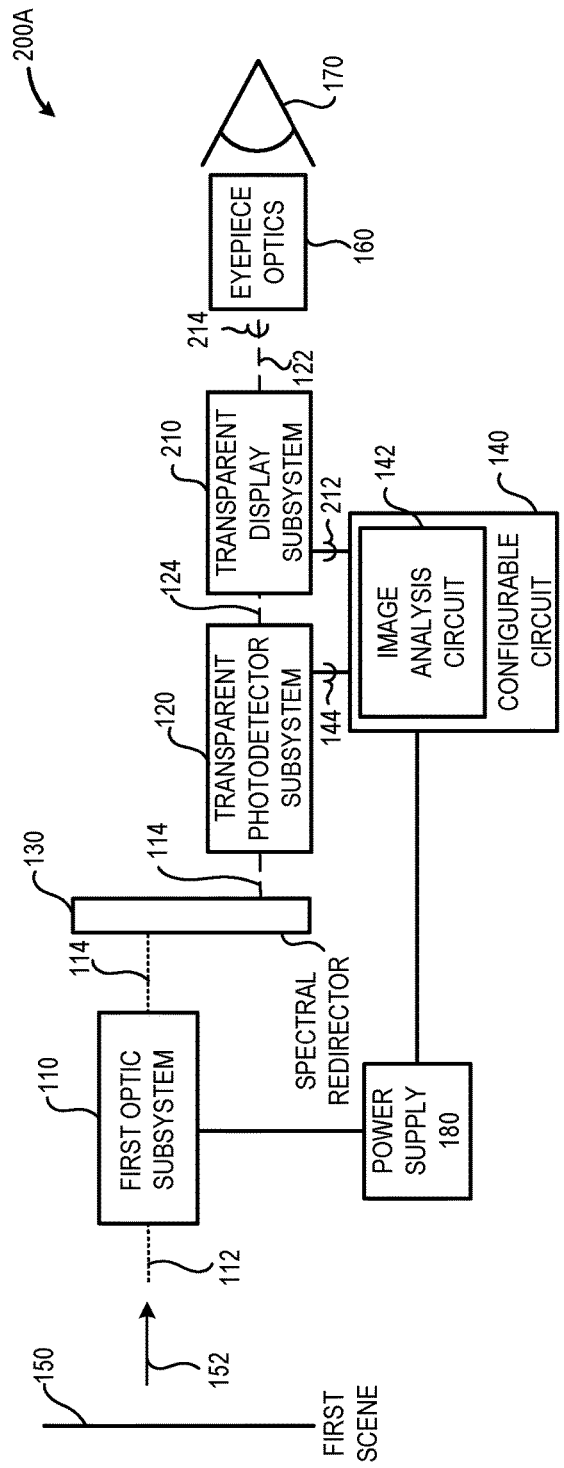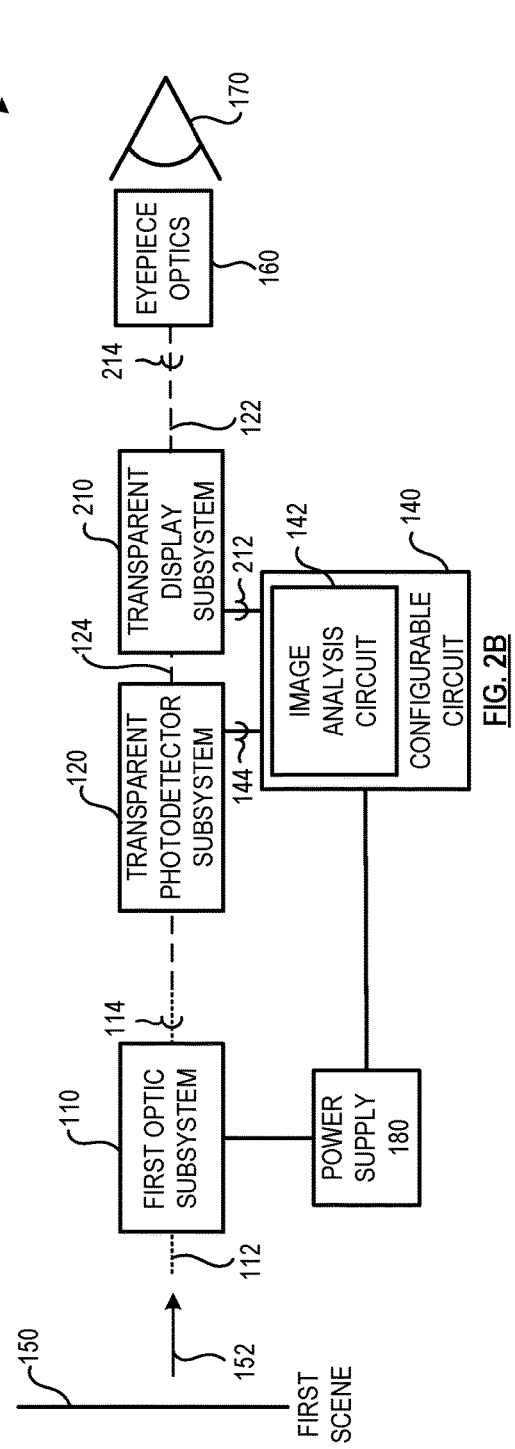

ENHANCED VISION SYSTEMS AND METHODS

TECHNICAL FIELD

The present disclosure relates to systems and methods for providing enhanced vision that includes composite imagery.

BACKGROUND

The ability for a human to react to the environment is bounded by the perceptual limitations of the human anatomy. If a structure, object, or individual cannot be sensed by at least one of the five human senses (taste, touch, sight, sound, smell), the ability for a human to detect the structure, object, or individual is severely limited or eliminated entirely. Thus, systems that enable the "ordinary" human senses to transcend their limitations may dramatically improve the ability for a person to identify structures, objects, and individuals within their environment.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 1A depicts an illustrative enhanced vision system that includes a first optic subsystem disposed along a first optical axis and a transparent photodetector subsystem and eyepiece optics are disposed along a second optical axis that is different than the first optical axis, in accordance with at least one embodiment described herein;

FIG. 1B depicts an illustrative enhanced vision system in which the first optic subsystem and the transparent photodetector subsystem and eyepiece optics are aligned along a common optical axis, in accordance with at least one embodiment described herein;

FIG. 2A depicts an illustrative enhanced vision system in which a first optic subsystem is aligned with a first optical axis and a transparent photodetector subsystem, transparent display subsystem, and eyepiece optics are coaxially disposed along a second optical axis that is different from the first optical axis, in accordance with at least one embodiment described herein;

FIG. 2B depicts another illustrative enhanced vision system in which the first optic subsystem, a transparent photodetector subsystem, a transparent display subsystem, and eyepiece optics are coaxially aligned along a common optical axis, in accordance with at least one embodiment described herein;

Figure 3:
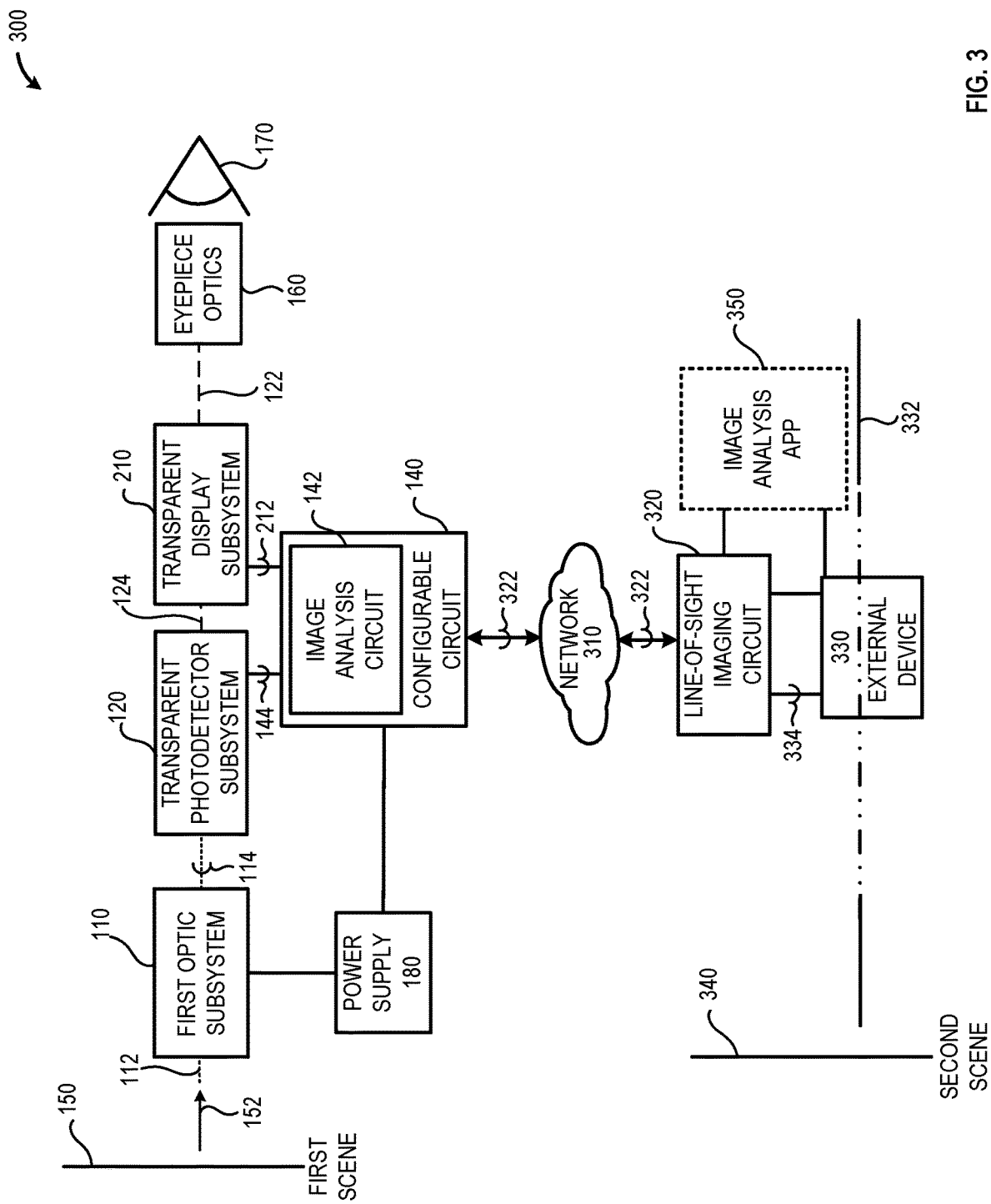
FIG. 3 depicts an illustrative enhanced vision system in which an enhanced vision system such as those depicted in FIGS. 1A, 1B, 2A, and 2B is communicably coupled via a network to line-of-sight imaging circuitry mounted on an external device, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

The systems and methods described herein provide enhanced vision systems and methods in which a transparent photodetector may be used to collect data or information regarding the imagery gathered by the enhanced vision system using a portion of the spectral content gathered and/or generated by the system. The use of the transparent photodetector beneficially permits the remaining portion of the spectral content gathered and/or generated by the system to pass through the system. Since the spectral content of the imagery falls within the visible spectrum, the portion passing through the system may advantageously be provided to the system user in either an unmodified state or a modified state as described below.

The portion of the spectral content gathered by the transparent photodetector may be provided to one or more image analysis circuits for subsequent processing. Such processing may be performed based at least in part on the intended use of the system. For example, a system intended to assist a user in recognizing other individuals may use the image data provided by the transparent photodetector to perform one or more facial recognition techniques. In another example, a system intended to assist tourists or visitors in an unfamiliar region may use the image data provided by the transparent photodetector to perform one or more landmark (e.g., building) recognition techniques. In yet another example, a system intended to assist a soldier in identifying potential threats within an environment may use the image data provided by the transparent photodetector subsystem to perform object recognition and assist with identifying threats within the environment.

The transparent photodetector may collect image data in one or more portions of the electromagnetic spectrum normally invisible to the unaided human eye. For example, the enhanced vision system may collect image data in the near-infrared (NIR—wavelengths of 750 nm to 900 nm) spectrum, the short wave infrared (SWIR—wavelengths of 900 nm to 1700 nm) spectrum, or the ultraviolet spectrum (UV—wavelengths of 200 nm to 400 nm). In yet another example, a system equipped with a NIR or SWIR absorbing photodetector subsystem may be used to assist law enforcement during evening hours, or in other times of similar limited visibility, by using the SWIR or NIR imagery to identify threats not easily discerned in the visible spectrum.

The first optic subsystem and the transparent photodetector subsystem may be combined with a transparent display subsystem to advantageously provide a compact, image enhancement solution capable of displaying data to the system user contemporaneous with the system user viewing of the image provided by the first optic subsystem and passing through the transparent photodetector subsystem and the transparent display subsystem. In such implementations, the use of the transparent display subsystem permits the enhanced vision system to overlay or display the data directly in the image seen by the system user. The enhanced vision system is advantageously able to generate such composite imagery in real time, with minimal or no latency.

At times, the first optic subsystem may include one or more low ambient light vision devices, such as one or more image intensifiers. In such implementations, the spectral output of the first optic subsystem may be different than the spectral content of the electromagnetic energy entering the first optic subsystem. For example, an image intensifier may output an image using a phosphor coated surface that renders the image in green, green/yellow, or white. Beneficially, such spectral content includes one or more frequencies or frequency bands useful to the transparent photodetector subsystem while still providing a high resolution visible image able to pass through the transparent photodetector subsystem and the transparent display subsystem to the system user.

An enhanced vision system is provided. The system may include: a means for receiving incident electromagnetic energy that includes at least a visible image of a first scene in a field-of-view of the first optic subsystem; a means for outputting electromagnetic energy in at least a visible portion of the electromagnetic spectrum, the visible electromagnetic energy output including at least a portion of the first scene; a means for receiving at least the visible electromagnetic output from the first optic subsystem that includes at least a portion of the first scene; a means for generating a first signal that includes information indicative of at least a portion of the first scene; and a means for transmitting at least the visible electromagnetic output from the first optic subsystem that includes at least a portion of the first scene.

An enhanced vision method is provided. The method may include receiving, by a first optic subsystem, incident electromagnetic energy that includes at least an image in the visible electromagnetic spectrum of a first scene in a field-of-view of the first optic subsystem; outputting, by the first optic subsystem, electromagnetic energy in at least a visible portion of the electromagnetic spectrum, the visible electromagnetic energy output including at least a portion of the first scene; receiving, by a first photosensitive element array disposed in a transparent photodetector subsystem, at least the visible electromagnetic energy from the first optic subsystem that includes at least a portion of the first scene; generating, by the first photosensitive element array, a first signal that includes information indicative of at least a portion of the first scene; and transmitting, by the transparent photodetector subsystem, at least the visible electromagnetic energy from the first optic subsystem that includes at least a portion of the first scene.

An enhanced vision system is provided. The enhanced vision system may include: a first optic subsystem that transmits a first scene within a field-of-view of the first optic subsystem in at least a visible portion of the electromagnetic spectrum; and a transparent photodetector subsystem that includes a first photosensitive element array disposed across at least a portion of a first surface of a transparent substrate, wherein the transparent photodetector subsystem is positioned with respect to the first optic subsystem such that the first photosensitive element array receives a first portion of the first scene; and wherein the transparent photodetector subsystem transmits at least a portion of the visible portion of the electromagnetic spectrum that includes at least the first portion of the first scene.

A storage device that includes machine-readable instructions that, when executed by a configurable circuit, cause the configurable circuit to transition to image analysis circuitry is provided. The image analysis circuitry may: receive, from a first photosensitive element array disposed in a transparent photodetector subsystem, a first signal that includes information indicative of at least a portion of a first scene in a field-of-view of a first optic subsystem; detect at least one object included in the first scene; determine at least one parameter associated with the at least one object appearing in the first scene; and generate a display output signal that includes data representative of the at least one parameter associated with the at least one object appearing in the first scene, wherein the data representative of the at least one parameter is displayed in a defined location in a transparent display subsystem with respect to the at least one object.

As used herein, the terms "top," "bottom," "up," "down," "upward," "downward," "upwardly," "downwardly" and similar directional terms should be understood in their relative and not absolute sense. Thus, a component described as being "upwardly displaced" may be considered "laterally displaced" if the device carrying the component is rotated 90 degrees and may be considered "downwardly displaced" if the device carrying the component is inverted. Such implementations should be considered as included within the scope of the present disclosure.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used herein, the term "visible electromagnetic spectrum" refers to the portion of the human-visible electromagnetic spectrum having wavelengths falling between approximately 400 nanometers (nm) and approximately 750 nm. Such electromagnetic radiation may be colloquially referred to as "visible light."

As used herein, the terms "near infrared," "near IR," and "NIR" refer to the portion of the electromagnetic spectrum having wavelengths falling between approximately 750 nm and approximately 900 nm.

As used herein, the terms "short wave infrared," "shortwave IR," and "SWIR" refer to the portion of the electromagnetic spectrum having wavelengths falling between approximately 900 nm and approximately 1700 nm (1.7 µm).

As used herein, the term "ultraviolet electromagnetic spectrum," and "UV electromagnetic spectrum" refer to a portion of the electromagnetic spectrum that includes one or more of: the UVA electromagnetic spectrum having wavelengths falling between approximately 315 nanometers (nm) and approximately 400 nm; the UVB electromagnetic spectrum having wavelengths falling between approximately 280 nm and approximately 315 nm; and/or the UVC electromagnetic spectrum having wavelengths falling between approximately 200 nm and approximately 280 nm.

As used herein, the term "optical axis" when used in reference to an optical device refers to the optical centerline through the center of one or more lenses comprising least a portion of the optical device.

As used herein, the term "longitudinal axis" when used in reference to a device refers to an axis through the longest or greatest dimension of the device. Thus, for a rectangular object, the "longitudinal axis" would refer to an axis parallel to the longest side of the rectangle. For an ellipse, the "longitudinal axis" would refer to an axis extending through (i.e., collinear with) the major axis of the ellipse.

As used herein, the term "lateral axis" when used in reference to a device refers to an axis through the shortest or smallest dimension of the device. Thus, for a rectangular object, the "lateral axis" would refer to an axis parallel to the shortest side of the rectangle. For an ellipse, the "lateral axis" would refer to an axis extending through (i.e., collinear with) the minor axis of the ellipse.

FIG. 1A depicts an illustrative enhanced vision system 100A that includes a first optic subsystem 110 disposed along a first optical axis 112 and a transparent photodetector subsystem 120 disposed along a second optical axis 122 that is different than the first optical axis 112, in accordance with at least one embodiment described herein. Operationally, the system user positions an eye 170 proximate an eyepiece optics 160 positioned along the second optical axis 122 and is able to view an enhanced version of a first scene 150 captured or otherwise acquired by the first optic subsystem 110. In the embodiment depicted in FIG. 1A, the first optical axis 112 and the second optical axis 122 are not coaxially aligned and a spectral redirector 130 may transition at least a portion of the spectral content output by the first optic subsystem 110 along the first optical axis 112 to the second optical axis 122.

The transparent photodetector subsystem 120 absorbs at least a portion of the spectral output of the first optic subsystem 110. The remaining portion of the spectral output of the first optic subsystem 110 passes through the transparent photodetector subsystem 120, exits the transparent photodetector subsystem 120 and enters the user's eye 170. The spectral content exiting the transparent photodetector subsystem 120 provides the user of the enhanced vision system 100A with an enhanced image of the first scene 150. In at least some implementations, the enhanced image of the first scene 150 includes one or more enhanced, altered, adjusted, or otherwise improved parameters associated with the image of the first scene 150. Such enhancements may include, but are not limited to, brightness, contrast, color, focus, or any combination thereof.

The transparent photodetector subsystem 120 may be communicably coupled to a configurable circuit 140. The configurable circuit 140 may execute machine-readable instruction sets that transform at least a portion of the configurable circuit 140 to a dedicated, specific, and particular image analysis circuit 142. The image analysis circuit 142 receives one or more signals 144 from the transparent photodetector subsystem 120. The one or more signals 144 include information and/or data representative of the image of the first scene 150 received by the transparent photodetector subsystem 120.

In embodiments, the information and/or data representative of the image of the first scene 150 may include information and/or data associated with one or more portions of the visible electromagnetic spectrum. In embodiments, the information and/or data representative of the image of the first scene 150 may include information and/or data associated with one or more portions of the near infrared (NIR) or short wave infrared (SWIR) electromagnetic spectrum. In yet other embodiments, the information and/or data representative of the image of the first scene 150 may include information and/or data associated with one or more portions of visible electromagnetic spectrum and one or more portions of the NIR or SWIR electromagnetic spectrum.

All or a portion of the electromagnetic energy exiting the first optic subsystem 110 provides an output 114 that is introduced to the transparent photodetector subsystem 120. In embodiments, the transparent photodetector subsystem 120 may be centered along the second optical axis 122 that extends parallel to the direction of travel of the incident electromagnetic energy in the output 114 from the first optic subsystem 110. As depicted in FIG. 1A, in some implementations, the first optical axis 112 and the second optical axis 122 may lie along different axes (i.e., the first optical axis 112 and the second optical axis 122 are not collinear).

The first optic subsystem 110 may include any number and/or combination of currently available or future developed devices and/or systems capable of gathering or collecting electromagnetic energy across all or a portion of the visible, NIR, SWIR, and/or UV electromagnetic spectra. The first optic subsystem 110 collects information and/or data representative of at least a portion of the first scene 150 within the field-of-view of the first optic subsystem 110. The first scene 150 may include a multitude and/or variety of objects of potential interest to the system user. The first optic subsystem 110 is centered along the first optical axis 112 that extends parallel to the direction of travel of the incident electromagnetic energy 152 through the first optic subsystem 110.

The first optic subsystem 110 provides an optically transmissive path through which at least a portion of the incident electromagnetic energy 152 received from the first scene 150 is able to pass and eventually exit the first optic subsystem 110 as an electromagnetic energy output 114. In at least some implementations, the first optic subsystem 110 provides an optically transmissive path along (i.e., parallel to) the first optical axis for at least a portion of the incident electromagnetic energy 152 received from the first scene 150. In some implementations, the first optic subsystem 110 provides an optically transmissive path for at least a portion of the visible incident electromagnetic energy 152 (i.e., the first optic subsystem 110 permits the passage of at least a portion of the incident electromagnetic energy 152 received from the first scene 150).

In some implementations, the first optic subsystem 110 may include one or more simple lenses. In some implementations, the first optic subsystem 110 may include one or more compound lenses. In some implementations, the first optic subsystem 110 may include a single glass or polycarbonate lens such as found in commercial eyewear. In some implementations, the first optic subsystem 110 may include a plurality of lenses arranged to provide one or more levels of magnification, such as found in telescopes, spotting scopes, sighting scopes, microscopes, and similar devices. In some implementations, the first optic subsystem 110 may include one or more currently available and/or future developed devices and/or systems capable of improving vision in low ambient light conditions, such as one or more light amplifiers, image intensifiers, or similar. In some implementations, the first optic subsystem 110 may include one or more fixed focus lenses. In some implementations, the first optic subsystem 110 may include one or more manual or automatically focusable variable focus lens systems.

The first optic subsystem 110 transmits all or a portion of the incident electromagnetic energy 152 to produce the electromagnetic energy output 114. The first optic subsystem 110 output may include electromagnetic energy within all or a portion of the visible electromagnetic spectrum, within all or a portion of the NIR electromagnetic spectrum, and/or within all or a portion of the SWIR electromagnetic spectrum. In some implementations, the first optic subsystem 110 may absorb or attenuate at least a portion of the incident electromagnetic energy 152, thus the energy level of the electromagnetic energy in the signal 114 may be less than the energy level of the incident electromagnetic energy 152. In some implementations, the first optic subsystem 110 may amplify the energy level of the incident electromagnetic energy 152 to produce an output 114 in which at least a portion of the electromagnetic spectrum is at an energy level greater than the incident electromagnetic energy 152. In some implementations, the first optic subsystem 110 may shift or alter the spectral content of the incident electromagnetic energy 152 such that the spectral content of the output 114 at least partially differs from the spectral content of the incident electromagnetic energy 152.

The first optic subsystem 110 may include one or more powered devices. Such powered imaging devices include, but are not limited to, one or more low-light imaging devices or one or more thermal imaging devices. Such powered devices may include, in addition to the imaging device, one or more illumination sub-systems, such as a NIR illumination subsystem. One or more power supplies 180 may be used to power the first optic subsystem 110. Such power supplies 180 may include one or more current or future developed portable energy storage devices. Such portable energy storage devices may include, but are not limited to: one or more supercapacitors, one or more ultracapacitors, one or more secondary (i.e., rechargeable) batteries, or combinations thereof.

In some implementations, the first optic subsystem 110 may include one or more devices that selectively limits the amount of light admitted to the enhanced vision system 100 by the first optic subsystem 110. For example, the first optic subsystem 110 may include one or more electrochromic elements that selectively limits or controls the amount of light admitted to the enhanced vision system 100. In embodiments, the one or more electrochromic elements may selectively limit or control the amount of light admitted uniformly across the entire field-of-view of the enhanced vision system 100. In embodiments, the one or more electrochromic elements may selectively limit or control the amount of light admitted in selected portions of the field-of-view of the enhanced vision system. For example, the one or more electrochromic elements may limit the amount of light in a localized area proximate an illuminated street light in a night-time scene.

The transparent photodetector subsystem 120 may include any number and/or combination of current and/or future developed systems and/or devices capable of transmitting at least a portion of the incident visible electromagnetic spectrum of the first scene 150 while contemporaneously producing an output 144 that includes information and/or data representative of the first scene 150 using at least a portion of the visible electromagnetic spectrum, the NIR electromagnetic spectrum, the SWIR electromagnetic spectrum, and/or the UV electromagnetic spectrum. The transparent photodetector subsystem 120 may include any number and/or combination of electrical components and/or semiconductor devices. The transparent substrate used to support the array of photosensitive elements may include polyethylene terephthalate (PET); indium tin oxide (ITO); borosilicate glass; soda-lime glass; lead glass; aluminosilicate glass; fused silica glass; sapphire ($Al_2O_3$); polyimide; or similar substances.

In some implementations, the transparent photodetector subsystem 120 may provide one or more output signals to the first optic subsystem 110. The one or more output signals may control one or more operational aspects of the first optic subsystem 110. For example, the one or more transparent photodetector subsystem output signals may control an aperture of a passive first optic subsystem 110 (e.g., a compound lens array) in response to the presence of an excessively bright portion of the first scene 150. In another example, the one or more transparent photodetector subsystem output signals may control a gain of an active first optic subsystem 110 (e.g., an image intensifier) in response to the presence of an excessively bright portion of the first scene 150.

In other embodiments, the one or more output signals may control one or more filtering or reflective element arrays included in the first optic subsystem 110. For example, the one or more output signals may control an actuateable array of micromirrors or similar reflective elements disposed in the first optic subsystem 110. Such reflective element arrays may selectively reflect electromagnetic energy having wavelengths between about 200 nanometers (nm) to about 1200 nm away from the first optic subsystem 110. In another example, the one or more output signals may control an array of light-filtering elements disposed in the first optic subsystem 110. Such light-filtering element arrays may selectively filter all or a portion of the electromagnetic energy having wavelengths of from about 200 nanometers (nm) to about 1200 nm from entering the first optic subsystem 110. Such reflective or light-filtering element arrays may beneficially selectively control the quantity of admitted electromagnetic energy in localized portions of the first optic subsystem 110, such as areas around bright spots (street lights, signage, interior lights, etc.). Such systems may be combined with an electrochromic elements to provide further control and/or selectivity of the electromagnetic energy admitted to the first optic subsystem 110.

The transmittance of the transparent photodetector subsystem 120 is a measure of the quantity of incident electromagnetic energy within the visible electromagnetic spectrum transmitted by the transparent photodetector subsystem 120. As such the transmittance also provides a qualitative measure of the relative brightness of the image visible to the system user—the greater the transmittance value, the brighter the image visible to the system user. The transparent photodetector subsystem 120 may have a transmittance of: about 50% or greater; about 60% or greater; about 70% or greater; about 80% or greater; or about 90% or greater.

In embodiments, the transparent photodetector subsystem 120 can include an array of photosensitive elements disposed across at least a portion of a surface of an optically transparent substrate. The transparent photodetector subsystem 120 permits at least a portion of the visible electromagnetic spectrum to pass through the transparent photodetector subsystem 120 while using a portion of at least one of: the visible electromagnetic spectrum, the NIR electromagnetic spectrum, and the SWIR electromagnetic spectrum to generate an output 144 that includes information and/or data representative of the first scene 150. In some implementations, the transparent photodetector subsystem 120 may use a portion of the ultraviolet (UV) spectrum to generate an output 144 that includes information and/or data representative of the first scene 150.

In embodiments, the transparent photodetector subsystem 120 may include one or more organic transparent photodetectors. In such implementations, the transparent photodetector subsystem 120 may include a number of photosensitive elements disposed as an array in, on, about, or across a transparent substrate. In some implementations, the photosensitive elements may include one or more graphene-based photosensitive elements deposited via chemical vapor deposition across at least a portion of a transparent substrate. In some implementations, the graphene-based photosensitive elements may overcoated (e.g., via spin coating or similar deposition techniques) with a metal oxide layer. The metal oxide layer may include, but is not limited to, titanium oxide ($TiO_2$); zinc oxide (ZnO); cobalt oxide ($Co_3O_4$); and tungsten oxide ($WO_3$). In such implementations, the metal oxide layer may have a thickness of: about 40 nanometers (nm) or less; about 45 nm or less; about 50 nm or less; about 55 nm or less; about 60 nm or less; about 70 nm or less; about 80 nm or less; about 90 nm or less; or about 100 nm or less.

In embodiments, the transparent photodetector subsystem 120 may include photochemically sensitive nanowires dispersed or otherwise disposed in, on, about, or across all or a portion of the transparent substrate. For example, in one implementation, the transparent photodetector subsystem 120 may include a nanowire array disposed in a regular or irregular structure. Such nanowires may be fabricated using one or more current or future available metals and/or metal alloys including, but not limited to: zinc oxide (ZnO) and/or cadmium oxide (CdO).

In embodiments, the transparent photodetector subsystem 120 may include a tungsten selenide ($WSe_2$) deposited on a transparent substrate. Such a transparent photodetector subsystem 120 may have a detection range that extends from about 370 nm to about 1200 nm. The tungsten selenide film may be deposited on the transparent substrate via pulsed-laser deposition (PLD). In embodiments, the transparent photodetector subsystem 120 may include oriented selenium nanobelts (SeNBs) deposited on a transparent substrate using vacuum evaporation.

In embodiments, the transparent photodetector subsystem 120 may include a silicon on insulator (SoI) substrate, a displaceable structure, and a plurality of silicon nanowires demonstrating a piezoresistance. The transparent photodetector subsystem 120 may include a waveguide that directs the incident electromagnetic energy toward the displaceable structure. The displaceable structure may displace in proportion to the energy and/or wavelength of incident electromagnetic energy. The resistance of the silicon nanowires may be used to generate a signal representative of the first scene 150.

As depicted in FIG. 1A, the electromagnetic energy providing the output 114 may exit the first optic subsystem 110 and enter the spectral redirector 130. The spectral redirector 130 may include any number and/or combination of currently available and/or future developed devices and/or systems capable of redirecting all or a portion of the electromagnetic energy included in output 114 to a direction that is generally parallel to the second optical axis 122. In embodiments, the spectral redirector 130 may include a plurality of angled reflective members, such as a plurality of angled mirrors, to redirect the output 114 of the first optic subsystem 110 to the transparent photodetector subsystem 120. In embodiments, the spectral redirector 130 may include at least one prismatic member capable of redirecting all or a portion of the output 114 of the first optic subsystem 110 to the transparent photodetector subsystem 120.

The configurable circuit 140 communicably coupled to the transparent photodetector subsystem 120 may include any number and/or combination of currently available or future developed electronic components and/or semiconductor devices capable of executing one or more sets of machine-readable instructions. Upon executing the one or more sets of machine-executable instructions, at least a portion of the configurable circuit 140 may be transformed to a dedicated and particular image analysis circuitry 142. The image analysis circuitry 142 receives the output signal 144 from the transparent photodetector subsystem 120 and enhances one or more parameters or aspects of the image information and/or data included in the output signal 144 to improve the user's perception of objects, conditions, and/or situations included in the first scene 150. In some implementations, the image analysis circuitry 142 may provide one or more outputs containing information associated with the enhanced parameters to the system user.

The configurable circuit 140 may include, in whole or in part, one or more hardwired circuits. The configurable circuit 140 may include one or more controllers, single- or multi-core processors, single- or multi-core microprocessors, or similar. The configurable circuit 140 may include, but is not limited to, one or more digital signal processors (DSPs); one or more reduced instruction set computers (RISCs); one or more systems-on-a-chip (SoCs); one or more programmable gate arrays (PGAs); one or more application specific integrated circuits (ASICs); one or more central processing units (CPUs); one or more graphical processing units (GPUs); or combinations thereof. In some implementations, the configurable circuit 140 may be communicably coupled to a storage device that stores or otherwise retains a device operating system and/or the machine-executable instruction sets. In some implementations, the power supply 180 may provide some or all of the power consumed by the configurable circuit 140.

The electromagnetic energy output 114 from the first optic subsystem 110 enters the transparent photodetector subsystem 120. At least a portion of the electromagnetic energy incident upon the transparent photodetector subsystem 120 is absorbed by the transparent photodetector subsystem 120. The remaining portion of the electromagnetic energy exits the transparent photodetector subsystem 120 as an output 124. In embodiments, the output 124 may include electromagnetic energy falling in the visible electromagnetic spectrum. In some implementations, the output 124 may also include electromagnetic energy falling in at least one of: the NIR electromagnetic spectrum; the SWIR electromagnetic spectrum, and/or the UV electromagnetic spectrum. The output 124 from the transparent photodetector subsystem 120 is generally parallel to the second optical axis 122.

The eyepiece optics 160 receive the output 124 of the transparent photodetector subsystem 120. The eyepiece optics 160 provide a location for the system, user to view an enhanced image of the first scene 150. The eyepiece optics 160 may include any number and/or combination of any current or future developed optical devices and/or systems that enable the system user to view the enhanced image of the first scene 150 provided by the enhanced vision system 100A. The eyepiece optics 160 are centered along the second optical axis 122 such that some or all of the output 124 from the transparent photodetector subsystem 120 falls incident upon the eyepiece optics 160. In some implementations, the eyepiece optics 160 may invert the image contained in the output 124 from the transparent photodetector subsystem 120.

The eyepiece optics 160 may include one or more simple lenses, one or more compound lenses, or combinations thereof. The eyepiece optics 160 may include one or more digital conversion and/or display devices. For example, the eyepiece optics 160 may include one or more devices to receive the output 124 and convert at least a portion of the electromagnetic energy contained in the output 124 to a digital image that may be displayed using a digital output device disposed in, on, or about the eyepiece optics 160.

FIG. 1B is a schematic diagram of another illustrative enhanced vision system 100B in which the first optical axis 112 and the second optical axis 122 are coaxially aligned, in accordance with at least one embodiment described herein. Such an arrangement beneficially aligns the optical axis of the first optic subsystem 110 with the optical axis of the transparent photodetector subsystem 120. Further, the eyepiece optics 160 may also be coaxially aligned with the first optic subsystem 110 and the transparent photodetector subsystem 120. Such an arrangement beneficially eliminates the use of the spectral redirector 130 as described in FIG. 1A.

FIG. 2A is a schematic diagram of an illustrative enhanced vision system 200A in which a first optic subsystem 110 is aligned with a first optical axis 112 and a transparent photodetector subsystem 120, transparent display subsystem 210, and eyepiece optics 160 are coaxially disposed along a second optical axis 122 that is different from the first optical axis 112, in accordance with at least one embodiment described herein. In the system 200A, the transparent photodetector subsystem 120 provides an output 144 to the image analysis circuitry 142. The output 144 includes information and/or data indicative of the content of the first scene 150. Using the information and/or data provided by the transparent photodetector subsystem 120 via the output 144, the image analysis circuitry 142 enhances the image containing the first scene 150 and provides a display output signal 212 to the transparent display subsystem 210.

The spectral redirector 130 transitions at least a portion of the electromagnetic energy in the output 114 from traveling along (i.e., parallel to) the first optical axis 112 to traveling along the second optical axis 122. The electromagnetic energy in the output 114 falls incident on the transparent photodetector subsystem 110 and at least a portion of the electromagnetic energy passes through the transparent photodetector subsystem 110 and falls incident on the transparent display subsystem 210. At least a portion of the electromagnetic energy in the output 124 from the transparent photodetector subsystem 110 falls incident upon and passes through the transparent display subsystem 210.

In embodiments, the data or information presented by the transparent display subsystem 210 is provided contemporaneous with the visible image of the first scene 150 exiting the transparent display subsystem 210. Such an arrangement beneficially permits the display of information relevant, related, or associated with the first scene 150 and/or objects appearing in the first scene 150 contemporaneous with the image of the first scene 150. For example, the image analysis circuit 142 may communicate or otherwise exchange information with one or more local or remote data structures to perform facial recognition on persons appearing in the first scene 150. Upon identifying an individual, the image analysis circuit 142 may generate the output 212 that displays the individual's name and, optionally, biographical information directly in the image viewed by the system user through the eyepiece optics 160.

In another example, the image analysis circuit 142 may communicate, transmit, or otherwise exchange information with one or more local or remote data structures in executing a landmark identification application. In such an application, the transparent photodetector subsystem 120 would forward an output 144 that includes information and/or data indicative of landmarks within the first scene 150 to the image analysis circuitry 142. The image analysis circuitry 142 would identify the particular landmark and generate the display output signal 212 that includes the name of the landmark and information related to the landmark directly in the image viewed by the system user through the eyepiece optics 160. The system 200A may display such information proximate or even overlaying the respective identified landmark.

In another example, the image analysis circuit 142 may communicate, transmit, or otherwise exchange information with one or more local or remote data structures (e.g., databases, data stores, or similar) in executing an object identification, object recognition, or shape recognition application. Using such an application, the transparent photodetector subsystem 120 would forward an output 144 to the image analysis circuitry 142. The output 144 may include information and/or data indicative of objects included in the first scene 150. The image analysis circuitry 142 would identify the shapes or other objects included in the first scene 150 and generate a display output signal 212 that includes the designators or other visible indicators identifying the shapes and/or objects appearing in the first scene 150. In some implementations, such designators or indicators may display a "halo" about the respective identified object in the first scene 150. The image analysis circuitry 142 may display such designators or indicators directly in the image viewed by the system user through the eyepiece optics 160.

The transparent display subsystem 210 may include any number and/or combination of currently available and/or future developed devices and/or systems capable of receiving the output 212 from the image analysis circuit 142 and generating a visible display output. In some implementations, the transparent display subsystem may include one or more display outputs disposed in, on, or, about a transparent substrate. In some implementations, the transparent display subsystem 210 may be disposed at least partially in, on, or about a second surface of the transparent substrate on which the transparent photodetector subsystem 120 is disposed. For example, the transparent photodetector subsystem 120 may be disposed on a first surface of a generally planar transparent substrate and the transparent display subsystem 210 may be disposed in, on, or about a second surface that is transversely opposed to the first surface of the transparent substrate.

The transparent display subsystem 210 may include any self-illuminated display device. Example self-illuminated transparent display devices may include, but are not limited to, a transparent organic light emitting diode (TOLED) display, a transparent thin film transistor (TFT) display, or a transparent light emitting diode (TLED) display. In embodiments, the transparent display subsystem 210 may include: one or more display devices that include pixels or similar light emitting elements; one or more display devices that include segments or similar light emitting elements; or combinations thereof. In some implementations, the transparent display subsystem may include one or more transparent displays fabricated using a silicon on transparent insulator (e.g., silicon-on-glass) technology.

The transparent display subsystem 210 may include one or more display devices using individually addressable elements, such as individually addressable pixels, segments, or similar. In embodiments, the use of individually addressable elements while in a low power mode of operation is facilitated using relatively few energized pixels and/or segments to provide information and/or data to the system user. The use of individually addressable display elements advantageously permits individual control of color and brightness of the display elements. Such individual display element control beneficially provides multi-level feedback to the system user. For example, by designating critical or priority information using display element color and/or brightness, the system user quickly identifies items within their field-of-view requiring immediate attention. In embodiments, the transparent display subsystem 210 simultaneously energizes: about 10% or less of available or total display elements; about 20% or less of available or total display elements; about 30% or less of available or total display elements; about 40% or less of available or total display elements; or about 50% or less of available or total display elements.

The transparent display subsystem 210 may include one or more passive matrix display devices, one or more active matrix display devices, or any combination thereof. Example, non-limiting, passive-matrix display devices include: passive-matrix transparent organic light emitting diode (PMOLED) displays; passive-matrix quantum dot displays; passive-matrix transparent liquid crystal displays; transparent passive-matrix micro-light emitting diode displays; transparent thin film transistor (TFT) displays and similar. Example, non-limiting active-matrix display devices include: passive-matrix transparent organic light emitting diode (AMOLED) displays; transparent electroluminescent displays; active matrix nanowire displays; active-matrix thin film transistor displays; and similar. The transparent display subsystem 210 may be disposed proximate or distal from the transparent photodetector subsystem 120. The transparent display subsystem 210 may include various user accessible controls and/or adjustments to control one or more of: a brightness parameter, a color parameter, a contrast parameter, a tint parameter, or combinations thereof.

In embodiments, the transparent display subsystem 210 may include one or more projection devices and one or more at least partially reflective members. In some implementations, the projection device may be positioned on an optical axis different than the second optical axis 122. In some implementations, the projection device may be positioned along an axis that is parallel to the second axis 122 or disposed at an angle (e.g., perpendicular, 90°) to the second axis 122. In some implementations, the projection device may project the display output toward the partially reflective member and the partially reflective member may transition the display output to the second axis 122. In such embodiments, the electromagnetic energy 124 corresponding to the visible image exiting the transparent photodetector subsystem 120 may pass through or around the partially reflective member, thereby allowing the system user to contemporaneously view the display output and the visible image via the eyepiece optics 160.

The transmittance of the transparent display subsystem 210 is a measure of the quantity of incident electromagnetic energy within the visible electromagnetic spectrum transmitted by the transparent display subsystem 210. As such the transmittance also provides a qualitative measure of the relative brightness of the image visible to the system user— the greater the transmittance value, the brighter the image visible to the system user. The transparent display subsystem may have a transmittance of: about 50% or greater; about 60% or greater; about 70% or greater; about 80% or greater; or about 90% or greater.

In some implementations, the image analysis circuitry 142 may align the display output 212 with the image of the first scene 150 passing through the transparent display subsystem 210. Such beneficially permits the alignment of the information displayed using the transparent display subsystem 210 with the actual image of the first scene 150 exiting the transparent display subsystem 210. Such enables, for example, the enhanced vision system 200A to generate and display a target designator over an object, subject, or shape identified as a potential target by the image analysis circuitry 142.

FIG. 2B is a schematic diagram of another illustrative enhanced vision system 200B in which the first optical axis 112 and the second optical axis 122 are coaxially aligned, in accordance with at least one embodiment described herein. Such an arrangement beneficially aligns the optical axis of the first optic subsystem 110 with the optical axis of the transparent photodetector subsystem 120 and the transparent display subsystem 210. Further, the eyepiece optics 160 may also be coaxially aligned with the first optic subsystem 110, the transparent photodetector subsystem 120, and the transparent display subsystem 210. Such an arrangement beneficially eliminates the use of the spectral redirector 130 as described in FIG. 2A.

FIG. 3 is a schematic diagram of an illustrative enhanced vision system 300 in which an enhanced vision system 100A, 100B, 200A, 200B such as depicted in FIGS. 1A, 1B, 2A, and 2B, respectively, is communicably coupled via a network 310 to line-of-sight imaging circuitry 320, in accordance with at least one embodiment described herein. In embodiments, the line-of-sight imaging circuitry 320 is operably coupled to an external device 330. In some implementations, the external device 330 may include a targeting scope or similar device that is, in turn, coupled to a device such as a firearm carried by the user of the enhanced vision system.

The external device 330 may include any number of currently available or future developed devices and/or systems that are aligned with a third optical axis 332 that is capable of generating a signal 334 that includes information and/or data representative of a second scene 340 appearing within the field-of-view of the external device 330. For example, the external device 330 may include a targeting scope attached to a firearm and the second scene 340 may be aligned with a target designator (e.g., a laser "dot" or similar designator) corresponding to the targeting point for the firearm. In such an instance, the line-of-sight imaging circuitry 340 may generate and/or communicate, transmit, or otherwise exchange one or more signals 334 that include information and/or data corresponding to an image of the second scene 340 including the target designator generated or otherwise produced by the external device 330.

The system 300 advantageously merges and/or combines the information and/or data provided by the transparent photodetector subsystem 120 with the information and/or data provided by the line-of-sight imaging circuitry 320. The image analysis circuitry 142 then aligns a first image represented or provided by the information and/or data received from the transparent photodetector subsystem 120 with a second image represented or provided by the information and/or data received from the line-of-sight imaging circuitry 320. The image analysis circuitry 142 aligns and overlays or otherwise merges the combined first image (from the transparent display subsystem 210) and second image (from the line-of-sight imaging circuitry 320) with the visible image of the first scene 150 transmitted through the transparent display subsystem 210.

The display output signal 212 provided to the transparent display subsystem 210 is thus advantageously able to identify objects or subjects appearing in the first scene 150 and is also able to provide an indication of the line-of-sight of the external device 330. As such, the display output signal 212 contains information and/or data that, when combined with the image of the first scene 150 passing through the transparent display subsystem 210, permits the system user to identify objects or subjects appearing in the first scene 150 and identify the targeting location of the firearm coupled to the external device 330 based on information provided by the line-of-sight imaging circuitry 320. Advantageously, such object identification and targeting information and/or data is provided in real time or near real time, thereby facilitating the system user's prompt response to threats present within the first scene 150.

The network 310 communicably coupling the line-of-sight imaging circuitry 320 with the image analysis circuitry 142 may include one or more wired networks and/or one or more wireless networks. In embodiments, the one or more wireless networks may include one or more personal area networks. In embodiments, the one or more wireless networks may include, but is not limited to, a BLUETOOTH® wireless network; a near field communication (NFC) wireless network, an INSTEON® wireless network, an IrDA wireless network, a wireless USB network; a Z-wave network; or a ZigBee wireless network.

The line-of-sight imaging circuitry 320 may include any number and/or combination of currently available or future developed devices and/or systems capable of executing one or more sets of machine-readable instructions that at least cause the wired or wireless communication of image data from the external device 330 to the image analysis circuitry 142. In some implementations, all or a portion of the line-of-sight imaging circuitry 320 may include a hardwired circuit. The line-of-sight imaging circuitry 320 may include any number and/or combination of any currently available and/or future developed electronic components and/or semiconductor devices. The line-of-sight imaging circuitry 320 may include, but is not limited to, one or more one or more digital signal processors (DSPs); one or more reduced instruction set computers (RISCs); one or more systems-on-a-chip (SoCs); one or more programmable gate arrays (PGAs); one or more application specific integrated circuits (ASICs); one or more central processing units (CPUs); one or more graphical processing units (GPUs); or combinations thereof.

The line-of-sight imaging circuitry 320 may include one or more storage devices that may be used to store or otherwise retain machine-readable instruction sets executable by the line-of-sight imaging circuitry 320 as well as information, and/or data used by the line-of-sight imaging circuitry 320. At least one of the applications executable by the line-of-sight imaging circuitry 320 may include an application that collects or otherwise acquires in real-time or on a near real-time basis information and/or data generated or otherwise collected by the external device 330. In some instances, the information and/or data generated by the external device 330 may include information representative of the second scene 340 falling within the line-of-sight of the external device 330 and/or the device to which the external device 330 is operably coupled. For example, the external device 330 may include a targeting scope with a laser designator that is operably coupled to a firearm such that the laser designator indicates the targeting point for the firearm. The line-of-sight imaging circuitry 320 may be disposed partially or completely within the external device 330 or may be disposed remote from the external device 330. The line-of-sight imaging circuitry 320 may receive information and/or data representative of the field-of-view of the targeting scope and may also include information and/or data indicative of the location of the laser designator within the field-of-view of the targeting scope. The line-of-sight imaging circuitry 320 may communicate some or all of the information and/or data received from the external device 330 to the image analysis circuitry 142.

In some instances, the external device 330 and/or the line-of-sight imaging circuitry 320 may execute one or more image analysis applications. Such image analysis applications may permit either or both the external device 330 and/or the line-of-sight imaging circuitry 320 to perform analyses such as shape recognition, target acquisition, and/or targeting data. Beneficially, by performing such analyses at the external device level or at the line-of-sight imaging circuitry level, such analyses may be tailored to the specific system to which the external device 330 is communicably coupled. For example, an external device 330 coupled to a surface-to-air missile system may have specialized shape recognition applications that quickly resolve shapes associated with aircraft, helicopters, drones, and other airborne vehicles while not resolving or less speedily resolving shapes associated with trucks and armored vehicles. Similarly, an external device 330 coupled to a light anti-tank weapon (LAW) may have specialized shape recognition applications that quickly resolve shapes associated with armored vehicles such as tanks and armored personnel carriers while not resolving or less speedily resolving shapes associated with airborne vehicles such as aircraft and helicopters. In such instances, the line-of-sight imaging circuitry 320 may communicate information and/or data 322 to the image analysis circuitry 142 including those shapes, objects or similar subjects already identified or recognized by the external device 330 and/or line-of-sight imaging circuitry 320. Such may beneficially improve the response time of the image analysis circuitry 142 in presenting the information to the system user via the transparent display subsystem 210.

The external device 330, as discussed above, may include any number and/or combination of currently available and/or future developed devices and/or systems capable of collecting information and/or data representative of the second scene 340 and communicating the collected information and/or data to the line-of-sight imaging circuitry 320. In some implementations, the external device 330 may be operably coupled to another device or system and may provide information and/or data regarding one or more performance parameters of the attached device or system. In some implementations, the external device 330 may include one or more passive devices or systems, such as one or more image acquisition devices. In some implementations, the external device 330 may include one or more active devices or systems, such as one or more illuminators, one or more infrared illuminators, one or more laser target designators, or combinations thereof. In some implementations, the external device 330 may include a combination of passive and active devices.

In some implementations, the external device 330 may be a "generic" device coupleable to a wide variety of devices and/or systems. Non-limiting examples of such "generic" devices or systems include: targeting scopes attachable to a wide variety of firearms, image acquisition devices (e.g., GoPro) attachable to a wide variety of surfaces, etc. In some implementations, the external device 330 may be a particular device coupleable to a specific or limited number of devices and/or systems. Non-limiting examples of such specific devices or systems include: targeting systems for a particular weapons system, etc.

Figure 4:
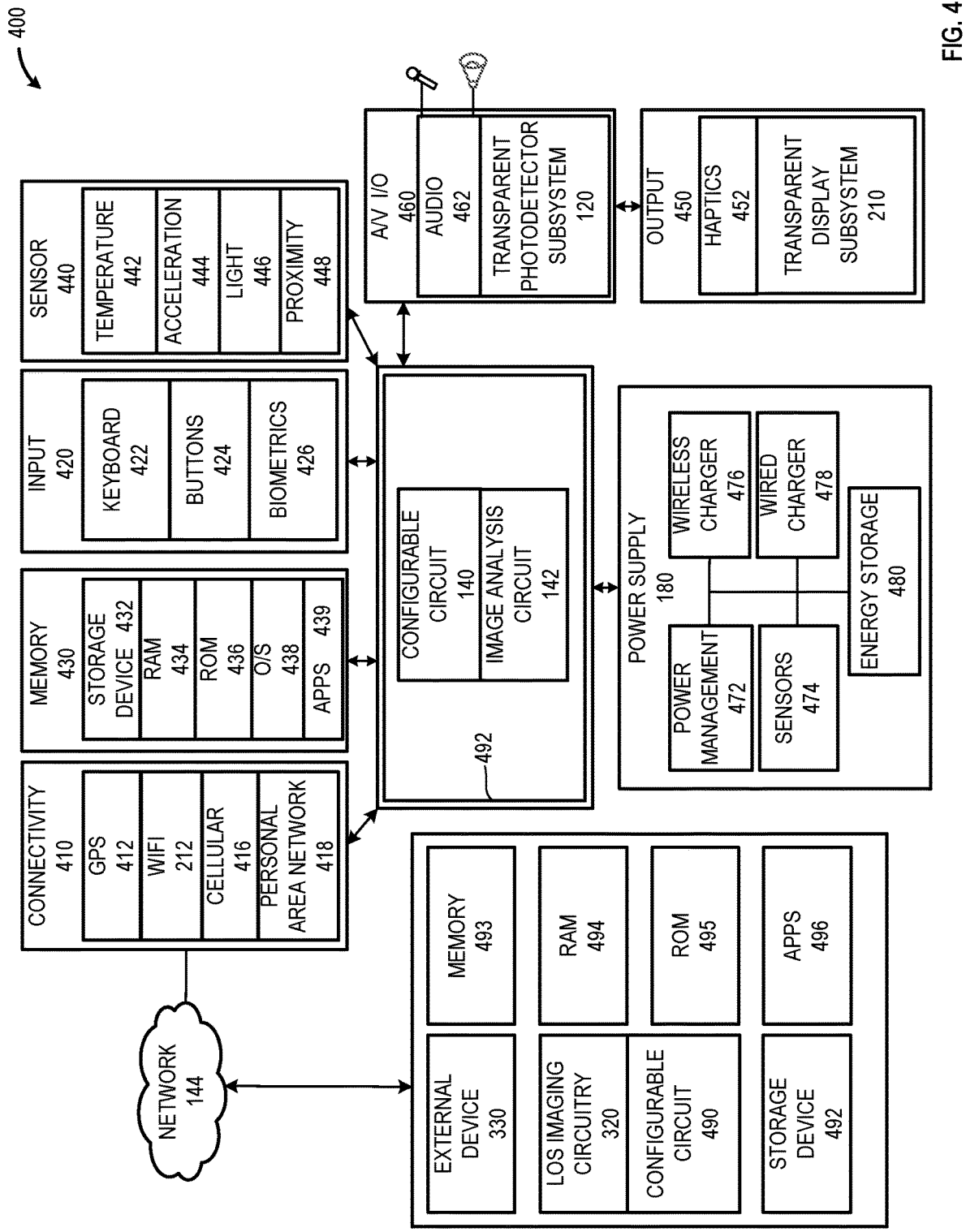
FIG. 4 depicts a block diagram of an illustrative enhanced vision system that includes an enhanced vision system communicably coupled to an external device, in accordance with at least one embodiment of the present disclosure described herein.

FIG. 4 is a block diagram of an illustrative enhanced vision system 400 that includes an enhanced vision system 200 communicably coupled to an external device, in accordance with at least one embodiment of the present disclosure. In embodiments, the enhanced vision system 200 may include one or more of the following: a connectivity subsystem 410; an input subsystem 420; a memory subsystem 430; a sensor subsystem 440; an output subsystem 450; an audio/visual (A/V) input/output system 460; and a power supply subsystem 470. The various subsystems may be communicably coupled to the configurable circuit 140 and/or the image analysis circuitry 142 via one or more communications links 482. For example, via one or more serial or parallel buses 482.

The connectivity subsystem 410 may include any number and/or combination of currently available and/or future developed wired and/or wireless transmitters, receivers, and/or transceivers. Example transmitters, receivers, and/or transceivers include, but are not limited to: one or more geolocation transceivers 412 (e.g., global positioning system/GPS; global navigation satellite system/GLONASS, Galileo); one or more IEEE 802.11 (Wi-Fi®) transceivers 414; one or more cellular transceivers 416 (e.g., CDMA, GSM, 3G, 4G, 5G, LTE); one or more personal area network transceivers 418 (e.g., Near Field Communication (NFC) transceivers, BLUETOOTH® transceivers). In at least some implementations, the connectivity subsystem 410 enables the enhanced vision system 200 to communicably couple to one or more external devices and/or systems via one or more networks 144. The one or more networks 144 may include, but are not limited to: one or more personal area networks (PANs); one or more local area networks (LANs); one or more metropolitan area networks (MANs); one or more virtual private networks (VPNs); one or more wide area networks (WANs); and/or one or more worldwide are networks (WWANs, such as the Internet).

The input subsystem 420 may include any number and/or combination of currently available and/or future developed devices and/or systems capable of receiving user input and providing one or more inputs including information and/or data corresponding to the received user input to the configurable circuit 140 and/or the image analysis circuitry 142. The input subsystem 420 may include input devices such as: one or more keyboards or similar text entry devices 422; one or more buttons or switches 424; and/or one or more biometric input devices 426. In some implementations, the one or more biometric input devices 426 may include one or more pupil or retina scanners capable of detecting the movement, motion, or direction of the system user's pupils and/or one or more blink counters that determine one or more parameters of a user's blink rate.

The memory subsystem 430 may include any number and/or combination of any currently available and/or future developed devices and/or systems capable of storing or otherwise retaining digital information and/or data. The memory subsystem 430 may include one or more storage devices 432. The one or more storage devices 432 may include, but are not limited to: one or more solid state drives (SSDs); one or more electrically erasable programmable rad only memories (EEPROMs); one or more rotating magnetic storage devices; one or more optical storage devices; one or more molecular storage devices, or combinations thereof. The one or more storage devices 432 may include one or more fixed or removable storage devices.

The memory subsystem 430 may additionally include one or more random access memories (RAM) 434 and/or read-only memories (ROM) 436 either or both of which may be provided in a fixed or removable format. In some implementations, the memory subsystem 430 may store or otherwise retain machine-readable instruction sets such as bootstrap code to enable the loading of an operating system 438 upon startup of the enhanced vision system 200. The memory subsystem 430 may include memory configured to hold information and/or data generated during the operation of enhanced vision system 200. Such memory may include, but is not limited to, static RAM (SRAM) or Dynamic RAM (DRAM). The ROM 434 may include storage devices such as basic input/output system (BIOS) memory configured to provide instructions when the enhanced vision system 200 activates, programmable memories such as electronic programmable ROMs, (EPROMS), Flash, etc.

The memory subsystem 430 may include other fixed and/or removable memory such as floppy disks, hard drives, etc., electronic memories such as solid state flash memory (e.g., eMMC), removable memory cards or sticks (e.g., uSD, USB), optical memories such as compact disc-based ROM (CD-ROM), or combinations thereof.

The memory subsystem 430 may include data, machine-readable instruction sets, and/or applications 439 that may cause the image analysis circuitry 142 to generate an output signal that includes information and/or data that, when combined with the image transmitted by the transparent display subsystem 210, provides the system user with an enhanced vision experience. Such enhanced user experiences may be referred to as "augmented reality" as data or information is combined with the image in near real time.

The memory subsystem 430 may include one or more applications 439 that cause the image analysis circuitry 142 to perform one or more shape or object detection methods using the image information and/or data in the signal 144 provided by the transparent photodetector subsystem 110 to the image analysis circuitry 142.

The memory subsystem 430 may include one or more applications 439 that cause the image analysis circuitry 142 to perform one or more shape or object recognition/identification methods using the image information and/or data in the signal 144 provided by the transparent photodetector subsystem 110 to the image analysis circuitry 142.

The memory subsystem 430 may include one or more applications 439 that cause the image analysis circuitry 142 to perform one or more facial recognition methods using information and/or data in the signal 144 provided by the transparent photodetector subsystem 110 to the image analysis circuitry 142.

The memory subsystem 430 may include one or more applications 439 that cause the image analysis circuitry 142 to align the image data included in the signal 144 provided to the transparent display subsystem 210 with the visible image transmitted through the transparent display subsystem 210.

The sensor subsystem 440 may include any number and/or combination of currently available and/or future developed devices and/or systems capable of detecting one or more internal and/or external parameters and/or conditions and generating one or more signals containing information and/or data representative of the respective detected parameter and/or condition. The sensor subsystem 440 may include to any number and/or combination of any currently available and/or future developed sensors, sensing elements, sensing devices, sensing systems, detectors, imagers, and the like. Non-limiting examples of such sensors include: one or more temperature sensors 442; one or more acceleration and/or gyroscopic sensors 444; one or more light sensors 446; one or more proximity sensors 448; or any combination thereof (hereinafter referred to singly or in any combination of multiple sensors as "sensors"). In embodiments, the sensor subsystem 440 may provide the configurable circuit 140 and/or the image analysis circuitry 142 with information and/or data indicative of one or more operational parameters of the enhanced vision system 200; one or more motion, direction, or orientations parameters of the enhanced vision system 200; one or more external conditions about the enhanced vision system 200; or any combination thereof.

In some implementations, information and/or data received by the image analysis circuitry 142 from one or more sensors may be used by the image analysis circuitry 142 to provide additional information and/or data to the system user. Such information and/or data may be incorporated into a display output provided to the transparent display subsystem 210. Such information and/or data may be provided to the system user via other human perceptible feedback systems such as the audio/visual input/output subsystem 460 or via a haptic or tactile feedback subsystem. At least a portion of the sensor subsystem may be disposed remote from the enhanced vision system. For example, a number of the sensors may be terrestrial or airborne based sensors that are communicably coupled to the image analysis circuitry 142 via one or more wired or wireless networks. In some implementations, some or all of the sensors may provide information and/or data to the image analysis circuitry 142 on a continuous basis in real-time or in near real-time. In some implementations, some or all of the sensors may provide information and/or data to the image analysis circuitry 142 on an event driven basis—for example upon detecting an occurrence of one or more defined events. In some implementations, some or all of the sensors may selectively provide the image analysis circuitry 142 with information and/or data upon request by the system operator. In some implementations, the image analysis circuitry 142 may selectively poll one or more communicably coupled sensors for information and/or data that may be incorporated into the information presented to the system operator via the transparent display subsystem 210.

The output subsystem 450 may include any number and/or combination of currently available and/or future developed devices and/or systems capable of generating one or more user perceptible outputs. The output subsystem 450 may include one or more haptic/tactile output devices 452. The output subsystem 450 includes the transparent display subsystem 210. The output subsystem 450 may also include the eyepiece optics 160.

The A/V Input/Output (I/O) subsystem 460 may include any number and/or combination of currently available and/or future developed devices and/or systems capable of receiving and/or transmitting audio data and/or video data. The A/V I/O system 460 may include, but is not limited to, one or more audio output devices 462. The A/V I/O system 460 may include the transparent photodetector subsystem 110.

The power supply subsystem 470 may include any number and/or combination of any currently available and/or future developed devices and/or systems capable of providing the enhanced vision system 200 with operating power. The power supply subsystem 470 may include, but is not limited to, one or more power management control circuits 472; one or more power sensors 474 (voltage sensors, current sensors, etc.); one or more wireless charging systems 476; one or more wired charging systems 478; one or more energy storage devices 480 (secondary batteries, supercapacitors, ultracapacitors, etc.) or combinations thereof.

The external device 330 may include one or more configurable circuits 490 capable of executing one or more machine-readable instruction sets. Upon executing at least a portion of the one or more machine-readable instruction sets, at least a portion of the one or more configurable circuits 490 may be transformed into particular and specialized line-of-sight imaging circuitry 320.

The external device 330 may include one or more storage devices 492. The one or more storage devices 492 may include any number and/or combination of currently available and/or future developed digital data storage device. The one or more storage devices 492 may be used to store or otherwise retain an operating system and one or more applications executable by the line-of-sight imaging circuitry 320. The one or more storage devices 492 may comprise at least a portion of the configurable circuit 490. The one or more storage devices 492 may include, but are not limited to: one or more solid state drives (SSDs); one or more electrically erasable programmable rad only memories (EEPROMs); one or more rotating magnetic storage devices; one or more optical storage devices; one or more molecular storage devices, or combinations thereof. The one or more storage devices 492 may include one or more fixed or removable storage devices.

The external device 330 may include one or more memory subsystems 493. The one or more memory subsystems 493 may additionally include one or more random access memories (RAM) 494 and/or read-only memories (ROM) 495 either or both of which may be provided in a fixed or removable format. In some implementations, the memory subsystem 493 may store or otherwise retain machine-readable instruction sets such as bootstrap code to enable the loading of an operating system upon startup of the external device 330. The memory subsystem 493 may include memory configured to hold information and/or data generated during the operation of external device 330. Such memory may include, but is not limited to, static RAM (SRAM) or Dynamic RAM (DRAM).

The memory subsystem 493 may include data, machine-readable instruction sets, and/or applications 496 that may cause the line-of-sight imaging circuitry 320 to generate an output signal that includes information and/or data that, when combined with the image transmitted by the transparent display subsystem 210, provides the system user with an enhanced vision experience. Such enhanced user experiences may be referred to as "augmented reality" as data or information is combined with the image in real time or near real time.

The memory subsystem 493 may include one or more applications 496 that cause the line-of-sight imaging circuitry 320 to perform one or more shape or object detection methods using the image information and/or data in the signal 322 provided to the image analysis circuitry 142.

The memory subsystem 493 may include one or more applications 496 that cause the line-of-sight imaging circuitry 320 to perform one or more shape or object recognition/identification methods using the image information and/or data in the signal 322 provided by the transparent photodetector subsystem 110 to the image analysis circuitry 142.

The memory subsystem 493 may include one or more applications 496 that cause the line-of-sight imaging circuitry 320 to perform one or more facial recognition methods using information and/or data in the signal 322 provided to the image analysis circuitry 142.

Figure 5:
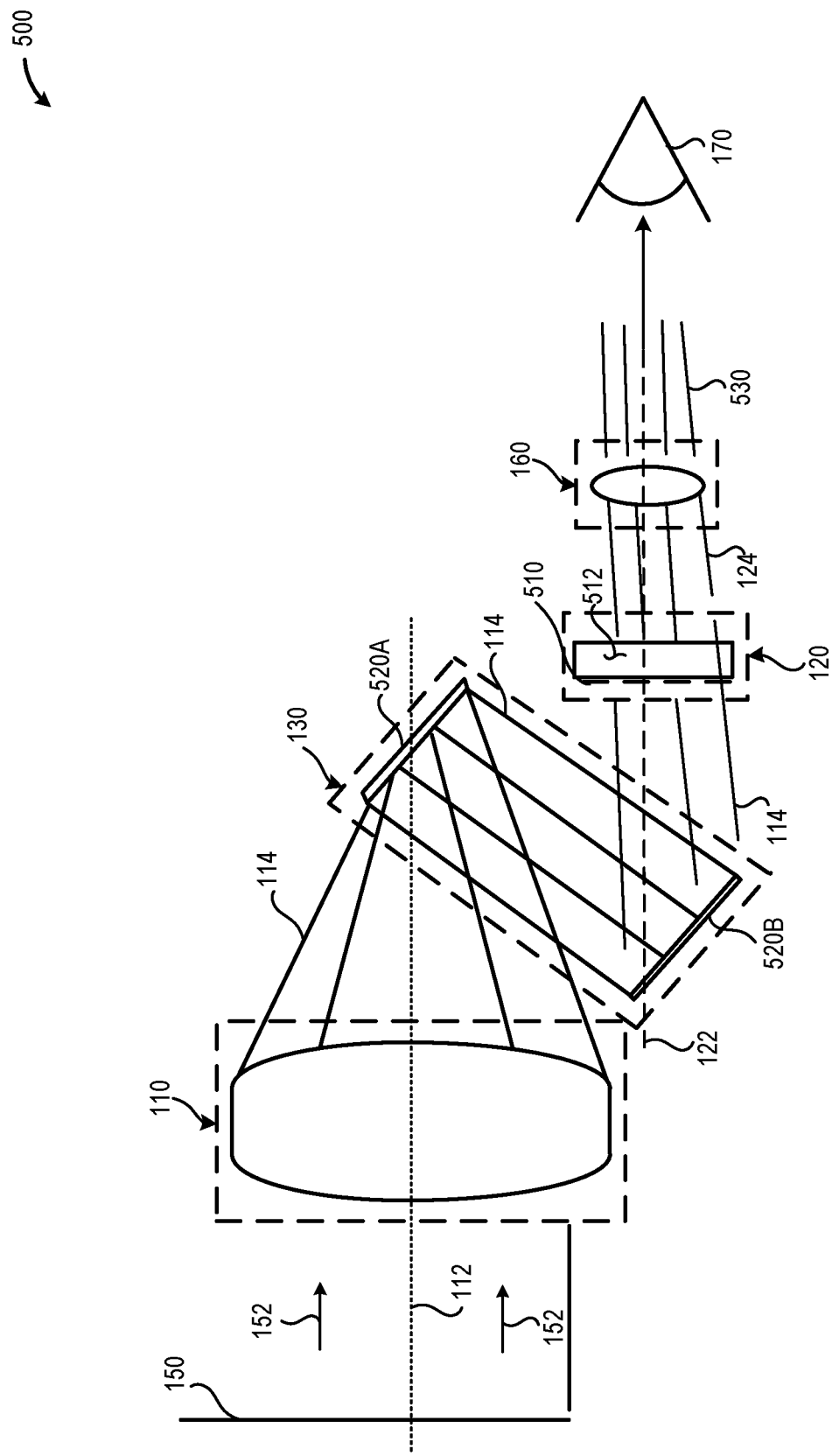
FIG. 5 depicts a schematic diagram of an illustrative enhanced vision system that includes a first optical subsystem, a spectral redirector, a transparent photodetector subsystem that includes a photosensitive element array disposed on a first side of a transparent conductor, and eyepiece optics, in accordance with at least one embodiment of the present disclosure described herein.

FIG. 5 is a schematic diagram of an illustrative enhanced vision system 500 that includes a first optical subsystem 110, a spectral redirector 130, a transparent photodetector subsystem 120 that includes a photosensitive element array 510 disposed on a first side of a transparent conductor 512, and eyepiece optics 160, in accordance with at least one embodiment of the present disclosure. Incident electromagnetic energy 152 from a first scene 150 is collected by the first optical subsystem 110. The electromagnetic output 114 from the first optical subsystem 110 travels along the first optical axis 112. The spectral redirector 130 receives at least a portion of the electromagnetic output 114 from the first optical subsystem 110.

The spectral redirector 130 includes at least a first reflective surface 520A and a second reflective surface 520B. The electromagnetic energy 114 received from the first optical subsystem 110, traveling along the first optical axis 112, enters the spectral redirector 130. Within the spectral redirector 130, the first reflective surface 520A reflects at least a portion of the incident electromagnetic energy 114 and directs the electromagnetic energy 114 towards the second reflective surface 520B. The electromagnetic energy 114 reflects from the second reflective surface 520B and exits the spectral redirector 130 along the second optical axis 122.

A first portion of the electromagnetic energy 114 exiting the spectral redirector 130 falls incident upon a photosensitive element array 510 disposed on a first surface of a transparent substrate 512. About 25% or more; about 50% or more; about 75% or more; about 90% or more; about 95% or more; or about 99% or more of the electromagnetic energy 114 incident upon the transparent photodetector subsystem 120 falls incident on the photosensitive element array 510. The remaining portion of the electromagnetic energy 114 exiting the spectral redirector 130 falls incident upon the transparent substrate 512. About 1% or less; about 5% or less; about 10% or less; about 25% or less; about 50% or less; or about 75% or less of the electromagnetic energy 114 incident upon the transparent photodetector subsystem 120 falls incident on the transparent substrate 512. The electromagnetic energy 114 passes through the transparent photodetector subsystem 120 and travels along the second optical axis 122 towards the eyepiece optics 160. The electromagnetic energy 124 passes through the eyepiece optics 160 and exits along the second optical axis to form an enhanced visible image of at least a portion of the first scene 150 that is viewable by the system user 170.

Figure 6:
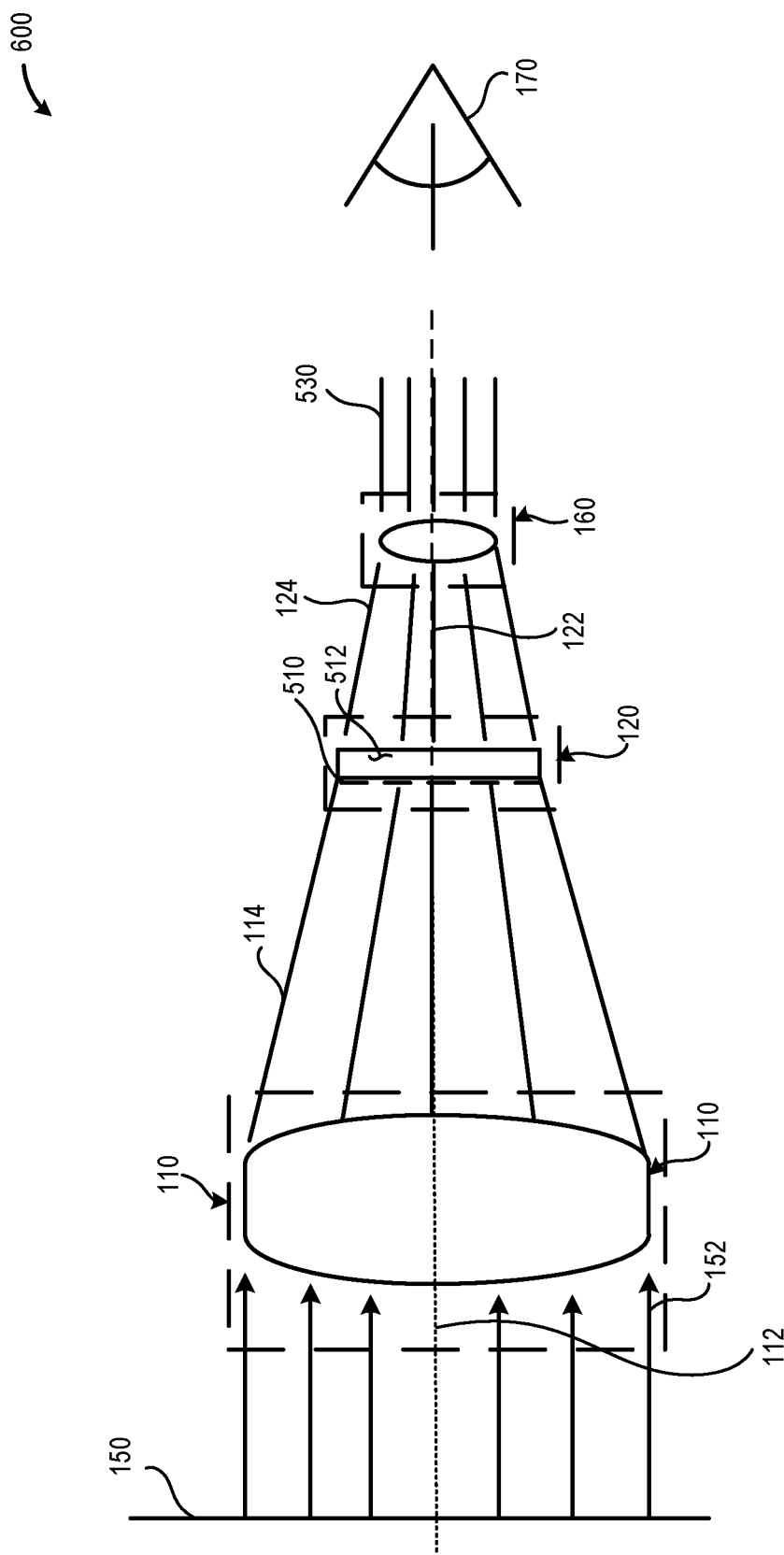
FIG. 6 depicts a schematic diagram of an illustrative enhanced vision system that includes a first optical subsystem, a transparent photodetector subsystem that includes a photosensitive element array disposed on a first side of a transparent conductor, and eyepiece optics disposed along a common optical axis, in accordance with at least one embodiment of the present disclosure described herein.

FIG. 6 is a schematic diagram of an illustrative enhanced vision system 600 that includes a first optical subsystem 110, a transparent photodetector subsystem 120 that includes a photosensitive element array 510 disposed on a first side of a transparent conductor 512, and eyepiece optics 160 disposed along a common optical axis, in accordance with at least one embodiment of the present disclosure. Incident electromagnetic energy 152 from a first scene 150 is collected by the first optical subsystem 110. The electromagnetic output 114 from the first optical subsystem 110 travels along the first optical axis 112.

A first portion of the electromagnetic energy 114 exiting the first optical subsystem 110 falls incident upon a photosensitive element array 510 disposed on a first surface of a transparent substrate 512. About 25% or more; about 50% or more; about 75% or more; about 90% or more; about 95% or more; or about 99% or more of the electromagnetic energy 114 incident upon the transparent photodetector subsystem 120 falls incident on the photosensitive element array 510. The remaining portion of the electromagnetic energy 114 exiting the first optical subsystem 110 falls incident upon the transparent substrate 512. About 1% or less; about 5% or less; about 10% or less; about 25% or less; about 50% or less; or about 75% or less of the electromagnetic energy 114 incident upon the transparent photodetector subsystem 120 falls incident on the transparent substrate 512. The electromagnetic energy 114 passes through the transparent photodetector subsystem 120 and travels along the second optical axis 122 towards the eyepiece optics 160. The electromagnetic energy 124 passes through the eyepiece optics 160 and exits along the second optical axis to form an enhanced visible image of at least a portion of the first scene 150 that is viewable by the system user 170.

Figure 7:
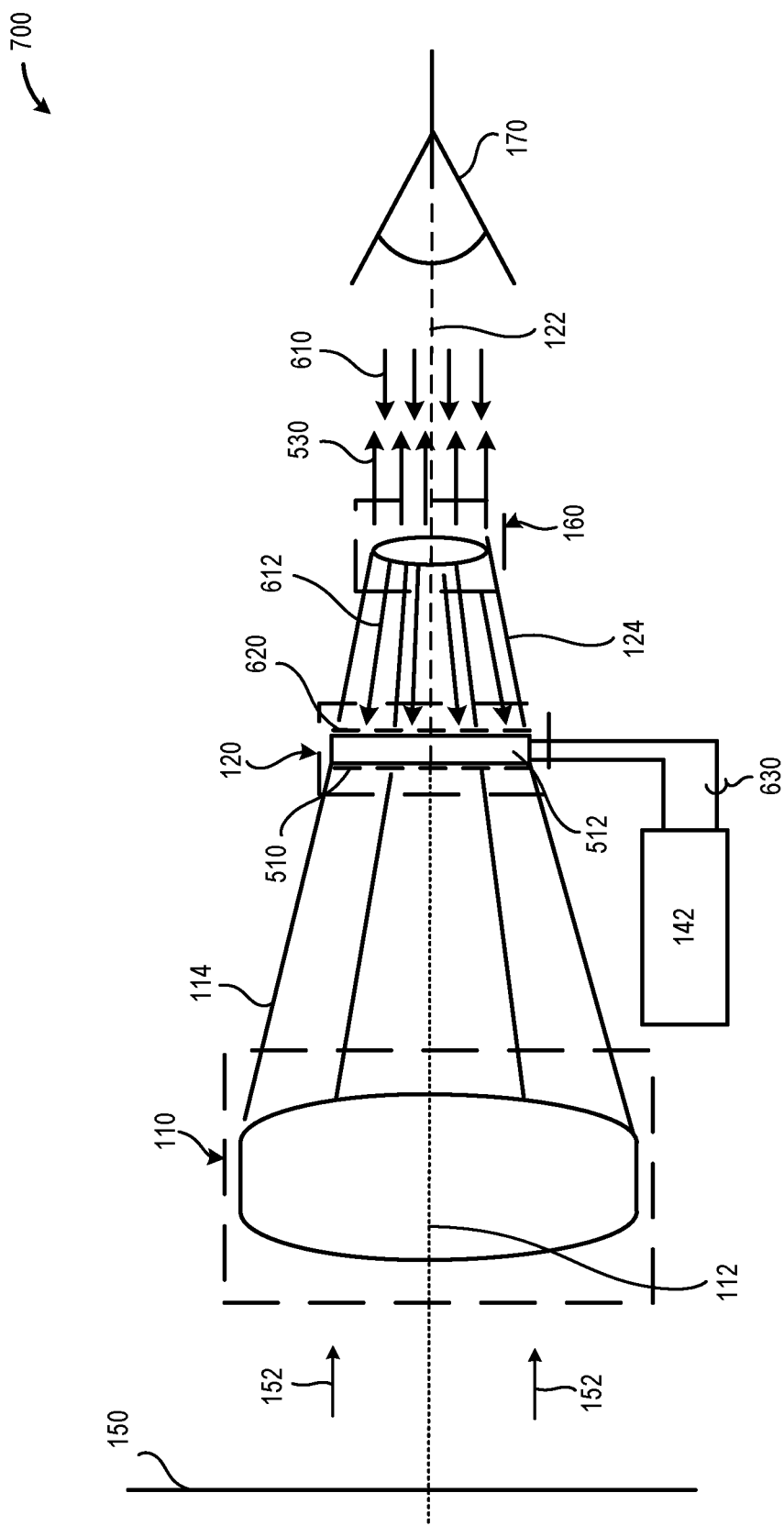
FIG. 7 depicts a schematic diagram of an illustrative enhanced vision system that includes a first optical subsystem, a transparent photodetector subsystem that includes a first photosensitive element array disposed on a first side of a transparent conductor and a second photosensitive element array that may be disposed on a second side of the transparent conductor, and eyepiece optics disposed along a common optical axis, in accordance with at least one embodiment of the present disclosure described herein.

FIG. 7 is a schematic diagram of an illustrative enhanced vision system 700 that includes a first optical subsystem 110, a transparent photodetector subsystem 120 that includes a photosensitive element array 510 disposed on a first side of a transparent conductor 512 and a second photosensitive element array 620 that may be disposed in a second side of the transparent conductor 512, and eyepiece optics 160 disposed along a common optical axis, in accordance with at least one embodiment of the present disclosure. Incident electromagnetic energy 152 from a first scene 150 is collected by the first optical subsystem 110. The electromagnetic output 114 from the first optical subsystem 110 travels along the first optical axis 112.

A first portion of the electromagnetic energy 114 exiting the first optical subsystem 110 falls incident upon a photosensitive element array 510 disposed on a first surface of a transparent substrate 512. About 25% or more; about 50% or more; about 75% or more; about 90% or more; about 95% or more; or about 99% or more of the electromagnetic energy 114 incident upon the transparent photodetector subsystem 120 falls incident on the photosensitive element array 510. The remaining portion of the electromagnetic energy 114 exiting the first optical subsystem 110 falls incident upon the transparent substrate 512. About 1% or less; about 5% or less; about 10% or less; about 25% or less; about 50% or less; or about 75% or less of the electromagnetic energy 114 incident upon the transparent photodetector subsystem 120 falls incident on the transparent substrate 512. The electromagnetic energy 114 passes through the transparent photodetector subsystem 120 and travels along the second optical axis 122 towards the eyepiece optics 160. The electromagnetic energy 124 passes through the eyepiece optics 160 and exits along the second optical axis to form an enhanced visible image of at least a portion of the first scene 150 that is viewable by the system user 170.

An electromagnetic energy 610 that includes an image of the system user's eye 170 enters the eyepiece optics 160, traveling in a direction opposite to the electromagnetic energy 530 exiting the eyepiece optics 160. The electromagnetic energy 612 exits the eyepiece optics 160 and falls incident upon a second photosensitive element array 620. As depicted in FIG. 7, in some embodiments, the second photosensitive element array 620 may be disposed, at least in part on at least a portion of a second surface of the transparent substrate 512. In other embodiments, the second photosensitive element array 620 may be disposed in whole or in part on a second transparent substrate disposed either proximate or spaced from the transparent substrate 512 that carries the first photosensitive element array 510.

The second photosensitive element array 620 generates a signal 630 that includes information and/or data regarding one or more parameters associated with the system user's eye 170. Such parameters may include, but are not limited to: the location of the system user's pupil location, a direction of movement of the system user's pupil, a speed of movement of the system user's pupil, and/or a system user's blink rate. The signal 630 may be communicated to the image analysis circuitry 142. In some implementations, the image analysis circuitry 142 may execute machine-readable instruction sets that permit the system user to adjust, alter, and/or control one or more parameters of the enhanced vision system 200 using the parameters associated with the user's eye. For example, the system user may scroll through a menu using an UP and DOWN eye movement and may use a designated blink count to SELECT an item from the menu.

Figure 8:
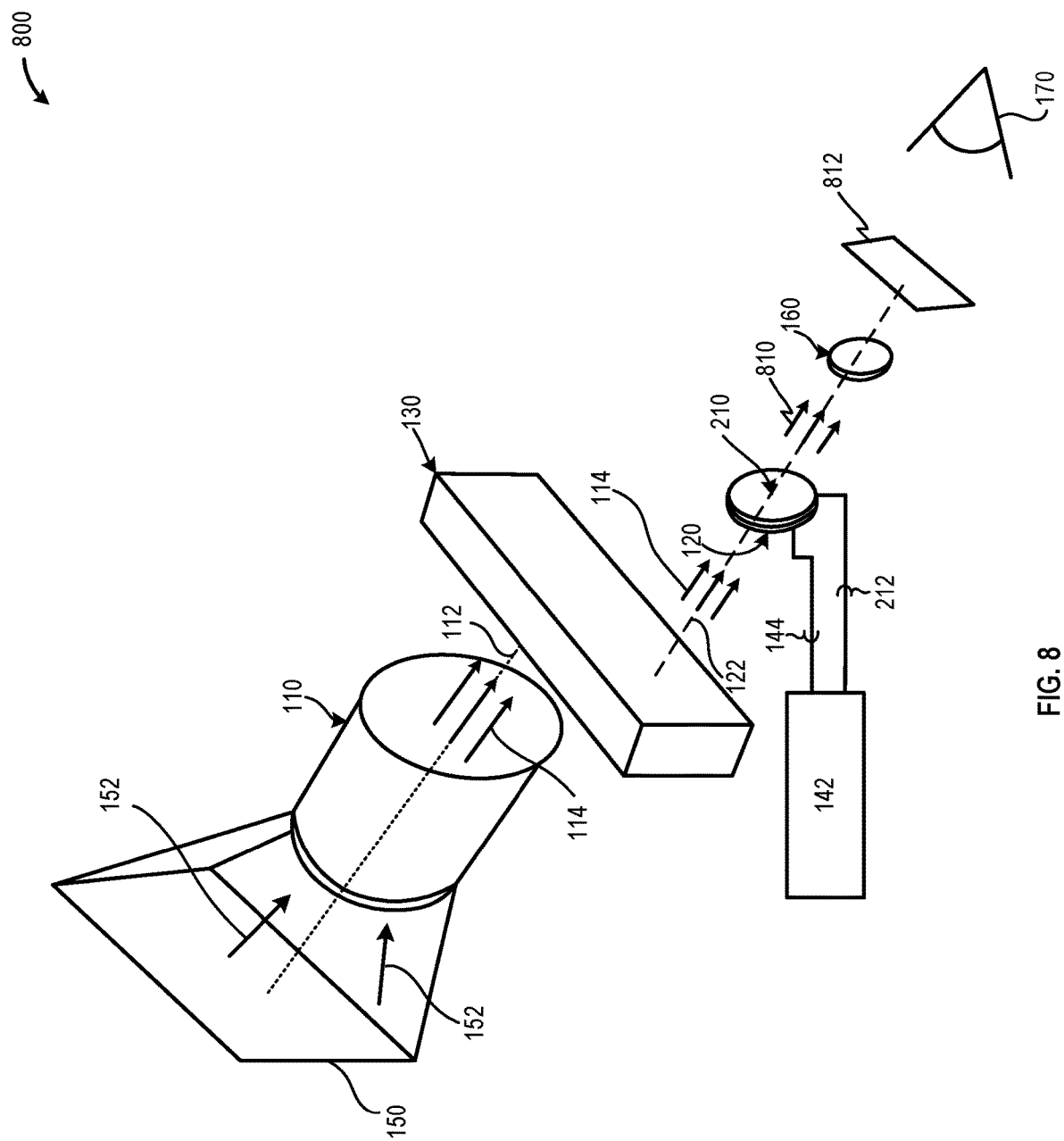
FIG. 8 depicts a perspective view of an illustrative enhanced vision system that includes a first optical subsystem in the form of an image intensifier disposed along a first optical axis, and a spectral redirector, a transparent photodetector subsystem, a transparent display subsystem, and eyepiece optics disposed along a second optical axis, in accordance with at least one embodiment of the present disclosure described herein.

FIG. 8 is a perspective view of an illustrative enhanced vision system 800 that includes a first optical subsystem 110 in the form of an image intensifier disposed along a first optical axis 112, a spectral redirector 130, and a transparent photodetector subsystem 120, a transparent display subsystem 210, and eyepiece optics 160 disposed along a second optical axis, in accordance with at least one embodiment of the present disclosure. The image intensifier receives incident electromagnetic energy 152 from the first scene 150. The image intensifier, enhances the ambient light image of the first scene 150 and generates an electromagnetic energy output 114 that may be color shifted (i.e., visible in a different frequency band or spectrum) than the original incident electromagnetic energy 152. For example, the image intensifier may output electromagnetic energy 114 across a predominantly green portion of the visible electromagnetic spectrum (e.g., between 510 nm and 570 nm). The electromagnetic energy 114 emitted by the image intensifier travels along the first optical axis 112 and falls incident upon the spectral redirector 130.

The spectral redirector 130 redirects the incident electromagnetic energy 114 such that the electromagnetic energy 114 exits the spectral redirector 130 along the second optical axis 122. The electromagnetic energy 114 falls incident upon the transparent photodetector subsystem 120. Using at least a portion of the incident electromagnetic energy 114, the transparent photodetector subsystem 120 generates a signal 144 that includes information and/or data representative of at least a portion of the first scene 150. The electromagnetic energy 124 exits the transparent photodetector subsystem 120 and enters the transparent display subsystem 210.

The image analysis circuitry 142 generates an output signal 212 that includes information and/or data for display on the transparent display subsystem 210. Such information and/or data may include, but are not limited to: one or more designators identifying objects appearing in the first scene 150; one or more sets of identification information associated with objects and/or persons appearing in the first scene 150; one or more environmental parameters associated with the first scene 150; information and/or data associated with a building, structure, or similar object appearing in the first scene 150; or combinations thereof. In some implementations, the image analysis circuitry 142 may use one or more object detection, recognition, and/or identification methods to analyze the information and/or data included in the signal 144 received from the transparent photodetector subsystem 120. In some implementations, the image analysis circuitry 142 may use one or more biometric, facial, and/or human detection, recognition, and/or identification methods to analyze the information and/or data included in the signal 144 received from the transparent photodetector subsystem 120.

In some implementations, the image analysis circuitry 142 may align the information and/or data included in the signal 212 provided to the transparent display subsystem 210 with persons, objects, and/or elements appearing in the image of the first scene 150. In some implementations, such alignment may be achieved by the image analysis circuitry 142 using the information and/or data included in the signal 144 received from the transparent photodetector subsystem 120.

The visible electromagnetic energy exiting the transparent photodetector subsystem 120 is combined with the visible output of the transparent display subsystem 210 to provide a composite image 810 to the eyepiece optics 160. In the composite image 810, the information and/or data provided by the image analysis circuitry 142 to the transparent display subsystem 210 via signal 212 is displayed contemporaneously with the visible image provided by the image intensifier output. Advantageously, the image analysis circuitry 142 updates the information in the signal 212 supplied to the transparent display subsystem 210 on a near real-time or real-time basis, thereby enabling the near-real time or real-time updating of the information provided in the visible image 812 of the first scene displayed to the system user. Such permits, for example, a target designator for a moving object in the first scene 150 to "follow" the movement of the object, thereby allowing more accurate assessment by the user of the enhanced vision system 800.

Figure 9:
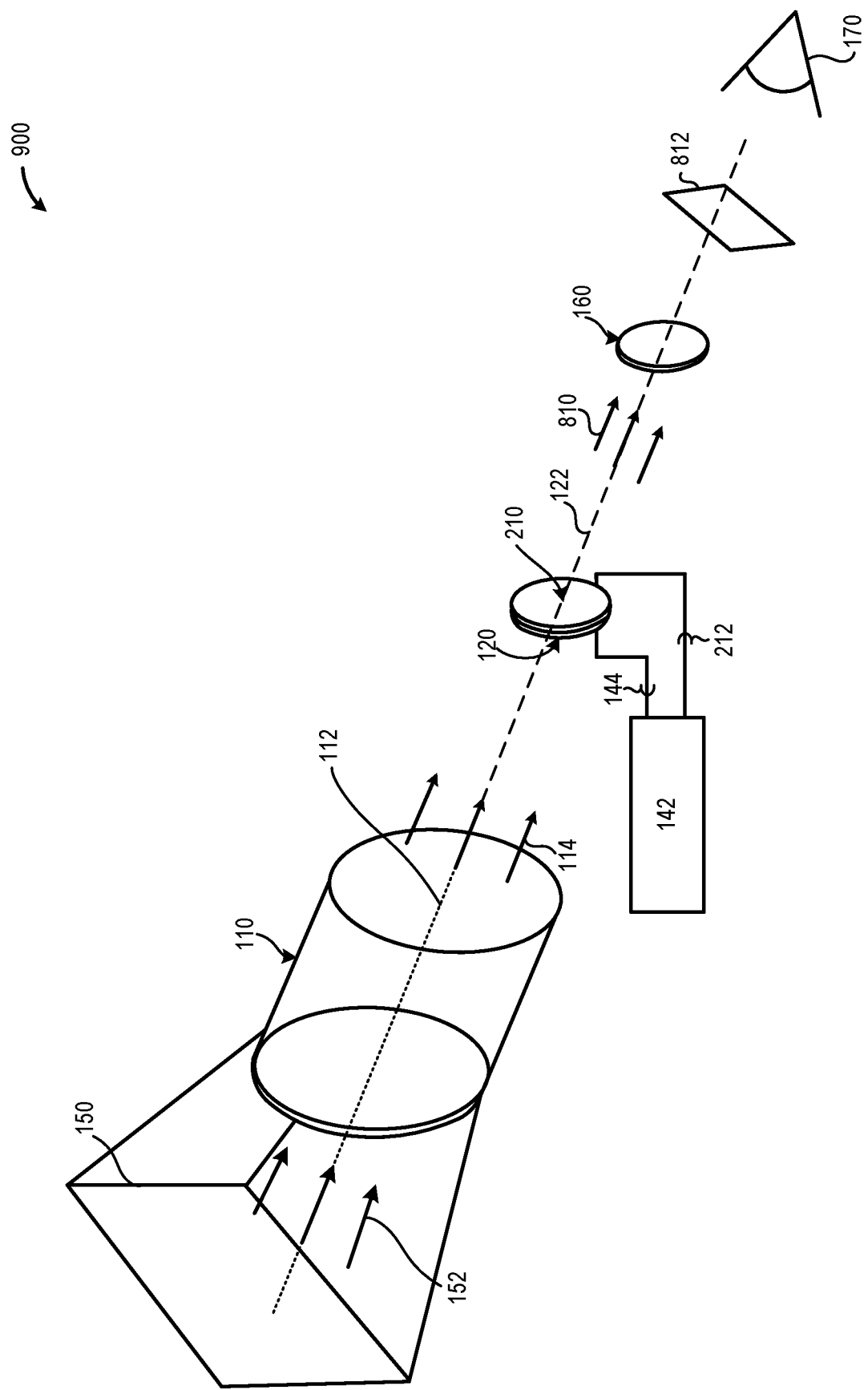
FIG. 9 depicts a perspective view of an illustrative enhanced vision system that includes a first optical subsystem in the form of an image intensifier, a transparent photodetector subsystem, a transparent display subsystem, and eyepiece optics disposed along a common optical axis, in accordance with at least one embodiment of the present disclosure described herein.

FIG. 9 is a perspective view of an illustrative enhanced vision system 900 that includes a first optical subsystem 110 in the form of an image intensifier, a transparent photodetector subsystem 120, a transparent display subsystem 210, and eyepiece optics 160 disposed along a common optical axis, in accordance with at least one embodiment of the present disclosure. The image intensifier receives incident electromagnetic energy 152 from the first scene 150. The image intensifier, enhances the ambient light image of the first scene 150 and generates an electromagnetic energy output 114 that may be color shifted (i.e., visible in a different frequency band or spectrum) than the original incident electromagnetic energy 152. For example, the image intensifier 110 may output electromagnetic energy 114 across a predominantly green portion of the visible electromagnetic spectrum (e.g., between 510 nm and 570 nm). The electromagnetic energy 114 emitted by the image intensifier 110 travels along the first optical axis 122 and falls incident upon the transparent photodetector subsystem 120. Using at least a portion of the incident electromagnetic energy 114, the transparent photodetector subsystem 120 generates a signal 144 that includes information and/or data representative of at least a portion of the first scene 150. The electromagnetic energy 124 exits the transparent photodetector subsystem 120 and enters the transparent display subsystem 210.

The image analysis circuitry 142 generates an output signal 322 that includes information and/or data for display on the transparent display subsystem 210. Such information and/or data may include, but are not limited to: one or more designators identifying objects appearing in the first scene 150; one or more sets of identification information associated with objects and/or persons appearing in the first scene 150; one or more environmental parameters associated with the first scene 150; information and/or data associated with a building, structure, or similar object appearing in the first scene 150; or combinations thereof. In some implementations, the image analysis circuitry 142 may use one or more object detection, recognition, and/or identification methods to analyze the information and/or data included in the signal 144 received from the transparent photodetector subsystem 120. In some implementations, the image analysis circuitry 142 may use one or more biometric, facial, and/or human detection, recognition, and/or identification methods to analyze the information and/or data included in the signal 144 received from the transparent photodetector subsystem 120.

In some implementations, the image analysis circuitry 142 may align the information and/or data included in the signal 212 provided to the transparent display subsystem 210 with persons, objects, and/or elements appearing in the image of the first scene 150. In some implementations, such alignment may be achieved by the image analysis circuitry 142 using the information and/or data included in the signal 144 received from the transparent photodetector subsystem 120.

The visible electromagnetic energy 124 exiting the transparent photodetector subsystem 120 is combined with the visible output of the transparent display subsystem 210 to provide a composite image 810 to the eyepiece optics 160. In the composite image 810, the information and/or data provided by the image analysis circuitry 142 to the transparent display subsystem 210 via signal 212 is displayed contemporaneously with the visible image provided by the image intensifier 110 output. Advantageously, the image analysis circuitry 142 updates the information in the signal 212 supplied to the transparent display subsystem 210 on a near real-time or real-time basis, thereby enabling the near-real time or real-time updating of the information provided by the composite image 810. Such permits, for example, a target designator for a moving object in the first scene 150 to "follow" the movement of the object, thereby allowing more accurate assessment by the user of the enhanced vision system 900.

Figure 10:
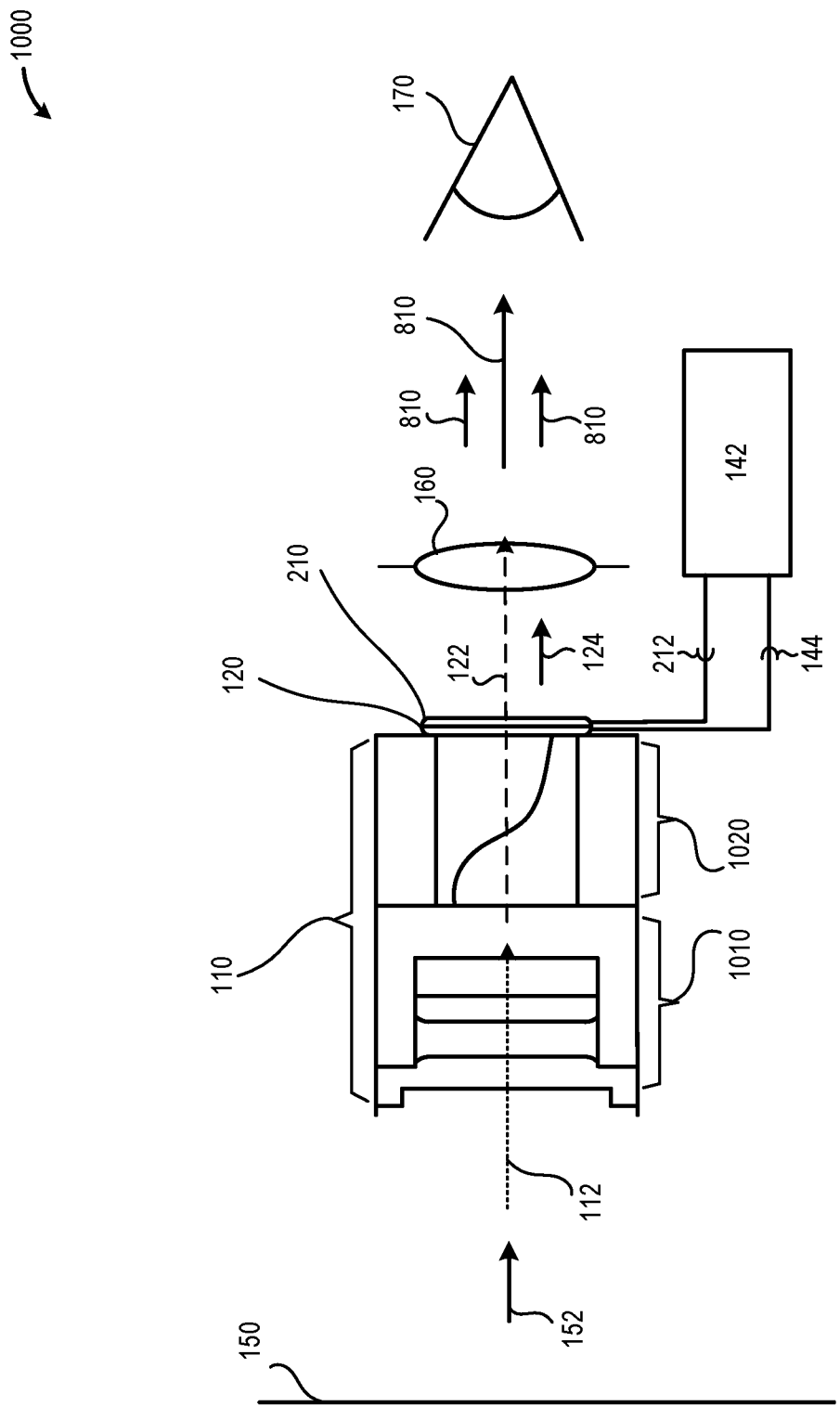
FIG. 10 depicts a schematic view of an illustrative enhanced vision system that includes a first optical subsystem in the form of an image intensifier, a transparent photodetector subsystem, a transparent display subsystem, and eyepiece optics disposed along a common optical axis, in accordance with at least one embodiment of the present disclosure described herein.

FIG. 10 is a schematic view of an illustrative enhanced vision system 1000 that includes a first optical subsystem 110 in the form of an image intensifier, a transparent photodetector subsystem 120, a transparent display subsystem 210, and eyepiece optics 160 disposed along a common optical axis 122, in accordance with at least one embodiment of the present disclosure. The image intensifier 110 includes an ambient light amplification portion 1010 and a visible image inversion portion 1020.

In operation, the image intensifier is a vacuum tube device used to amplify ambient light collected from the first scene 150 to levels observable by the user of the enhanced vision system 1000. The ambient light amplification portion 1010 includes an object lens that collects and focuses collected ambient light on a photocathode. The photocathode converts the incident photons into photo-electrons. The photo-electrons are accelerated using an applied potential to create an electric field. The accelerated photo-electrons are multiplied using a micro-channel plate. The micro-channel plate contains a large number of holes. When the photo-electrons enter the holes, additional electrons are emitted. The emitted electrons strike a phosphor screen to produce a visible image. The image produced by the phosphor screen is inverted. The inversion portion 1020 re-inverts the image of the first scene 150 such that the scene is displayed properly upright.

In some implementations, the transparent photodetector subsystem 110 may be formed directly on the image intensifier. For example, the surface of the image intensifier may provide the transparent substrate 512 (not visible in FIG. 10) for the transparent photodetector subsystem 120 and some or all of the photosensitive element array 510 (not visible in FIG. 10) may be formed directly in, on, or about the image intensifier 110.

In some implementations, the transparent display subsystem 210 may be placed, deposited, or otherwise formed proximate the transparent photodetector subsystem 120. For example, the transparent substrate carrying at least a portion of the transparent display subsystem 210 may be placed, formed, or otherwise deposited directly or indirectly (e.g., through the use of intervening material layers) in, on, or about the transparent photodetector subsystem 120.

Figure 11:
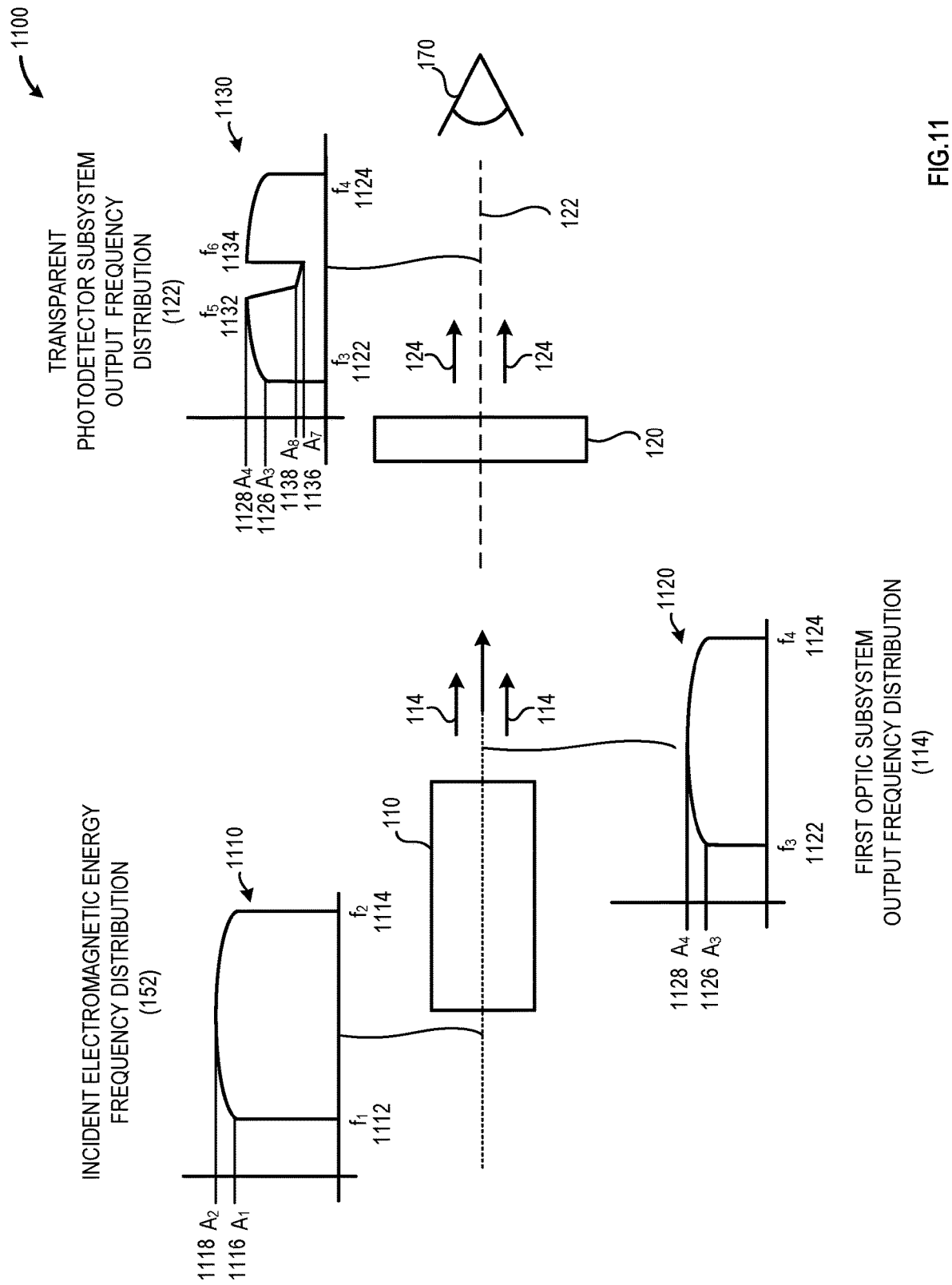
FIG. 11 depicts an example spectral content at various locations within an illustrative enhanced vision system, in accordance with one or more embodiments described herein.

FIG. 11 depicts the spectral content at various locations within an illustrative enhanced vision system 1100, in accordance with one or more embodiments described herein. As depicted in FIG. 11, the incident electromagnetic energy 152 distribution 1100 from the first scene 150 may be represented as a frequency distribution between a first frequency ($f_1$) 1112 and a second frequency ($f_2$) 1114. Passage of the incident electromagnetic energy 152 through the first optical subsystem 110 may attenuate the strength of the incident electromagnetic energy 152 and may, in some implementations, shift the spectral distribution 1120 of the electromagnetic energy 114 output from the first optical subsystem 110, for example between a third frequency 1122 ($f_3$) and a fourth frequency 1124 ($f_4$). Passage of the electromagnetic energy 114 through the transparent photodetector subsystem 120 may absorb all or a portion of the spectral distribution of the electromagnetic energy 114 output by the first optical subsystem 110. For example, a portion of the spectrum between a fifth frequency 1132 ($f_5$) and a sixth frequency 1134 ($f_6$) may be attenuated by passage through the transparent photodetector subsystem 120.

The incident electromagnetic energy 152 may have a spectral distribution 1110. The spectral distribution may range evenly or unevenly across a spectrum bounded by the first frequency 1112 and the second frequency 1114. The first frequency 1112 may fall within the visible spectrum (e.g., may be at or above a wavelength of 390 nm) or may include some or all of the ultraviolet spectrum falling below the visible spectrum. The second frequency 1114 may fall within the visible spectrum (e.g., may be at or below a frequency of 750 nm) or may include some or all of the NIR spectrum and some or all of the SWIR spectrum. The energy content of the electromagnetic energy included in the spectral distribution 1110 may range between a first value 1116 ($A_1$) and a second value 1118 ($A_2$).

The electromagnetic energy 114 exiting the first optical subsystem 110 may have a spectral distribution 1120. In some implementations (not depicted in FIG. 11), the spectral distribution of the electromagnetic energy 114 exiting the first optical subsystem 110 may have the same or a similar frequency range as the incident electromagnetic energy 152 received from the first scene 150. In some implementations, such as depicted in FIG. 11, the spectral distribution 1120 of the electromagnetic energy 114 exiting the first optical subsystem 110 may have a smaller frequency range as the incident electromagnetic energy 152 received from the first scene 150. For example, the spectral distribution 1120 of the electromagnetic energy 114 exiting the first optical subsystem 110 may range evenly or unevenly across a spectrum bounded by the third frequency ($f_3$) 1122 and the fourth frequency ($f_4$) 1124. The third frequency 1122 may fall within the visible spectrum (e.g., may be at or above a wavelength of 390 nm) or may include some or all of the ultraviolet spectrum falling below the visible spectrum. The fourth frequency 1124 may fall within the visible spectrum (e.g., may be at or below a frequency of 750 nm) or may include some or all of the NIR spectrum and some or all of the SWIR spectrum. The energy content of the electromagnetic energy included in the spectral distribution 1110 may range between a third value 1126 ($A_3$) and a fourth value 1128 ($A_4$). The third value 1126 and the fourth value 1128 may be lower or less than the first value 1116 ($A_1$) and the second value 1118 ($A_2$) due to attenuation through the first optical subsystem 110.

The electromagnetic energy 124 exiting the transparent photodetector subsystem 120 may have a spectral distribution 1130. In some implementations, the spectral distribution 1130 of the electromagnetic energy 124 exiting the transparent photodetector subsystem 120 may have a frequency range similar to the incident electromagnetic energy 114 received from the first optical subsystem 110. For example, the spectral distribution 1130 of the electromagnetic energy 124 exiting the transparent photodetector subsystem 120 may range evenly or unevenly across a spectrum bounded by the third frequency ($f_3$) 1122 and the fourth frequency ($f_4$) 1124. However, the transparent photodetector subsystem 120 generates the signal 144 containing information and/or data regarding the first scene 150 by absorbing a portion of the electromagnetic energy across a third frequency band. For example, the transparent photodetector subsystem 120 may generate the signal 144 containing information and/or data regarding the first scene 150, based at least in part, by evenly or unevenly absorbing a portion of the electromagnetic energy from all or a portion of a third frequency band above a fifth frequency ($f_5$) 1132 and below a sixth frequency ($f_6$) 1134.

The fifth frequency ($f_5$) 1132 may fall within the visible spectrum (e.g., may be at or above a wavelength of 390 nm) or may include some or all of the ultraviolet spectrum falling below the visible spectrum. The sixth frequency ($f_6$) 1134 may fall within the visible spectrum (e.g., may be at or below a frequency of 750 nm) or may include some or all of the NIR spectrum and some or all of the SWIR spectrum. The energy content of the electromagnetic energy of the frequencies falling within the third frequency band may be less than the energy content of the electromagnetic energy 114 incident upon the transparent photodetector subsystem 120. For example, the energy content of the third frequency band may range between a seventh value ($A_7$) 1136 and an eighth value (As) 1138.

Figure 12:
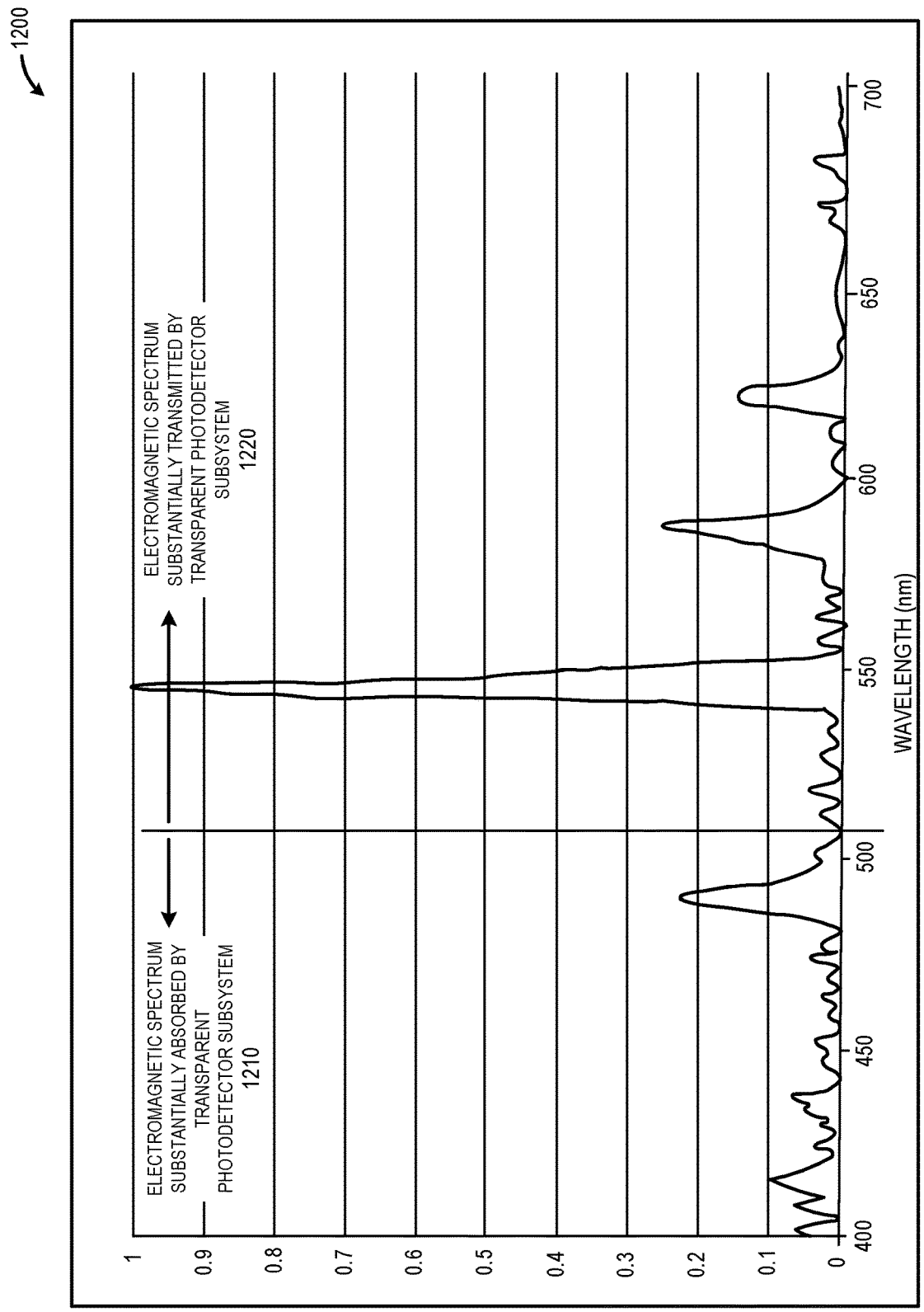
FIG. 12 depicts a plot showing normalized frequency output spectral strength of an example first optical subsystem equipped with an image intensifier, in accordance with at least one embodiment described herein.

FIG. 12 is a plot 1200 depicting an illustrative spectral output of an example first optical subsystem 110 equipped with an image intensifier, in accordance with at least one embodiment described herein. Plot 1200 shows a normalized frequency distribution for the electromagnetic energy output 114 of an illustrative first optical subsystem 110 using an image intensifier. As seen in plot 1200, the electromagnetic energy output 114 from the illustrative first optical subsystem 110 includes peaks at about 490 nm, about 550 nm, about 580 nm, and about 625 nm. In some implementations, a first portion 1210 of the electromagnetic energy may be at least partially absorbed and attenuated by the transparent photodetector subsystem 120 to generate the signal 144 that includes information and/or data associated with the first scene 150. Thus, as depicted in FIG. 12, the electromagnetic energy output 114 between about 400 nm and 500 nm may be collected by the transparent photodetector subsystem 120 for use by the image analysis circuitry 142 while the remaining portion 1220 of the electromagnetic energy output 114 between 500 nm and 700 nm passes through the transparent photodetector subsystem 120 and provides the system user a visible image of the first scene 150.

Figure 13:
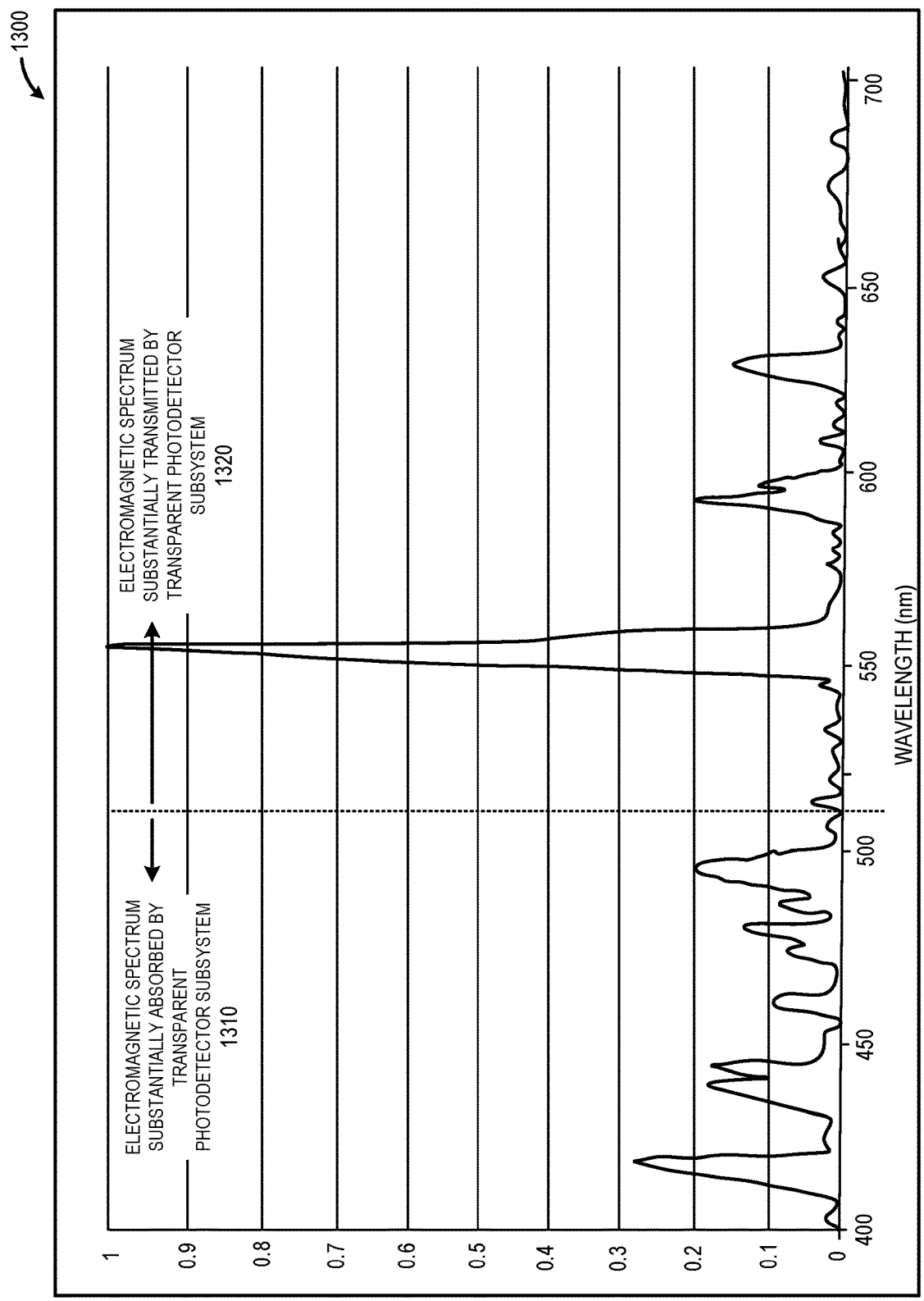
FIG. 13 depicts a plot showing normalized frequency output spectral strength of another example first optical subsystem equipped with an image intensifier, in accordance with at least one embodiment described herein.

FIG. 13 is a plot 1300 depicting an illustrative spectral output of another example first optical subsystem 110 equipped with an image intensifier, in accordance with at least one embodiment described herein. Plot 1300 shows a normalized frequency distribution for the electromagnetic energy output 114 of an illustrative first optical subsystem 110 using an image intensifier. As seen in plot 1300, the electromagnetic energy output 114 from the illustrative first optical subsystem 110 includes peaks at about 410 nm, about 440 nm, about 475 nm, about 490 nm, about 550 nm, about 580 nm, and about 625 nm. In some implementations, a first portion 1310 of the electromagnetic energy may be at least partially absorbed and attenuated by the transparent photodetector subsystem 120 to generate the signal 144 that includes information and/or data associated with the first scene 150. Thus, as depicted in FIG. 13, the first portion 1310 of the electromagnetic energy output 114 between about 400 nm and 520 nm may be collected by the transparent photodetector subsystem 120 for use by the image analysis circuitry 142 while the remaining portion 1320 of the electromagnetic energy output 114 between 500 nm and 700 nm passes through the transparent photodetector subsystem 120 and provides the system user a visible image of the first scene 150.

Figure 14:
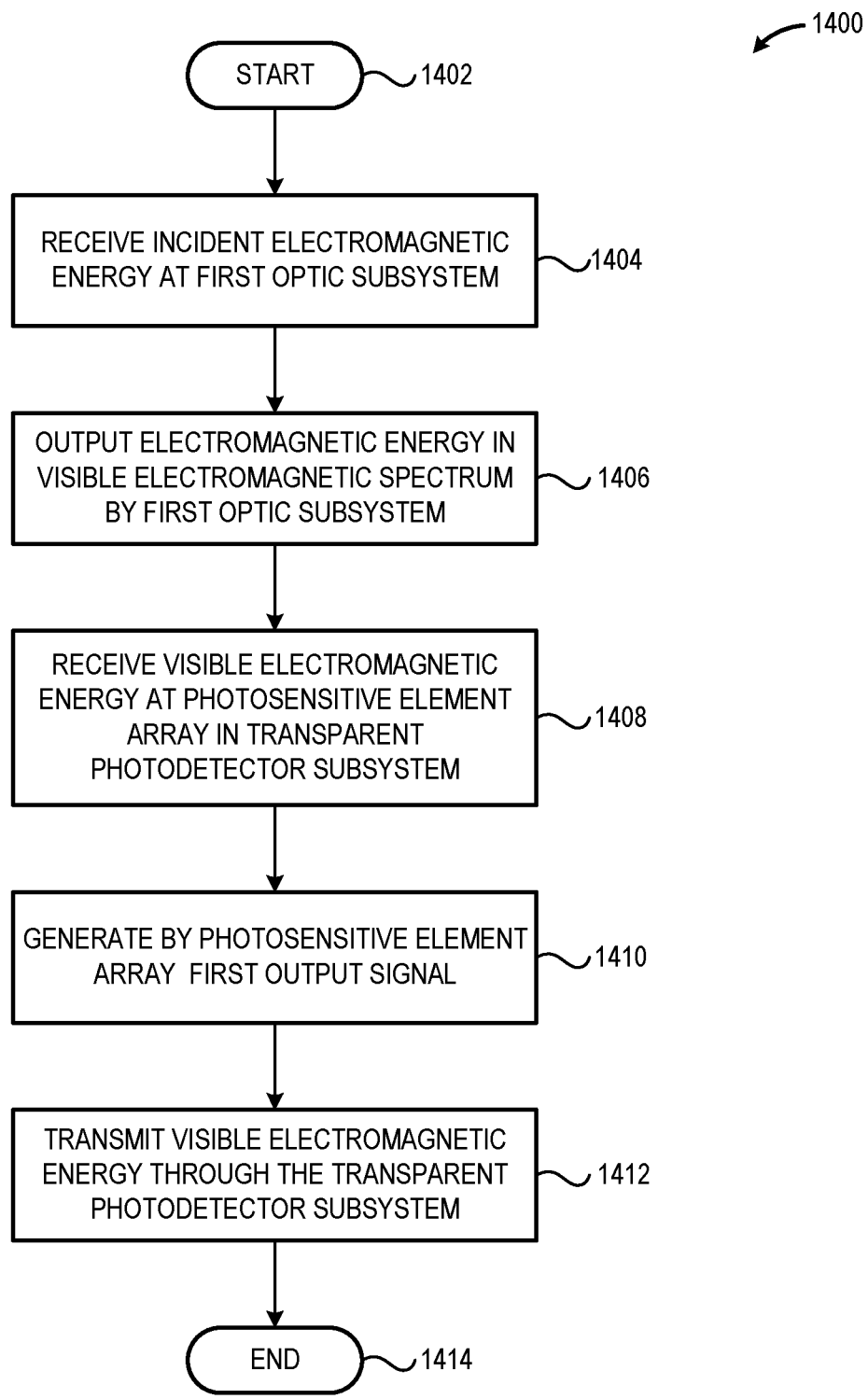
FIG. 14 depicts a high level flow diagram of an illustrative enhanced vision method, in accordance with at least one embodiment of the present disclosure described herein.

FIG. 14 is a high-level logic flow diagram of an illustrative enhanced vision method 1400, in accordance with at least one embodiment described herein. A first optic subsystem 110 disposed along a first optical axis 112 collects incident electromagnetic energy 152 from a first scene 150 within the field-of-view of the first optic subsystem 110. In implementations, the incident electromagnetic energy 152 may fall within at least a portion of the visible electromagnetic spectrum. The first optic subsystem 110 provides an electromagnetic energy output 114 that travels parallel to the first optical axis 112. The electromagnetic energy output 114 includes energy within at least a portion of the visible electromagnetic spectrum. In some implementations, the electromagnetic energy output 114 may include electromagnetic energy that falls within the ultraviolet electromagnetic spectrum, the NIR electromagnetic spectrum, or the SWIR electromagnetic spectrum. The electromagnetic energy output 114 falls incident upon a transparent photodetector subsystem 120 that is disposed along a second optical axis. A portion of the electromagnetic energy output 114 may impinge upon a first photosensitive element array 510 disposed on a transparent substrate 512 and a portion of the electromagnetic energy output 114 may pass through the transparent photodetector subsystem 120. The electromagnetic energy output 124 from the transparent photodetector subsystem 120 includes a visible image of the first scene 150 in at least a portion of the visible electromagnetic spectrum. The method 1400 commences at 1402.

At 1404, the first optic subsystem 110 receives incident electromagnetic energy 152 from a first scene 150. In some implementations, the first optic subsystem 110 may include a passive system that receives only ambient incident electromagnetic energy 152 from the first scene 152. In some implementations, the first optic subsystem 110 may include an active system that uses a number of illuminators to illuminate the first scene and the incident electromagnetic energy 152 may include at least a portion of the electromagnetic energy used to illuminate the first scene 150. In some implementations, the incident electromagnetic energy 152 includes electromagnetic energy in the visible spectrum and may include incident electromagnetic energy in the UV electromagnetic spectrum, the NIR electromagnetic spectrum, and/or the SWIR electromagnetic spectrum.

In some implementations, the first optic subsystem 110 may include a passive device, such as a simple lens; combinations of simple lenses, a compound lens, or combinations of compound lenses. In some implementations, the first optic subsystem 110 may include at least one active device, such as an image intensifier or similar low ambient light enhanced vision device.

At 1406, the first optic subsystem 110 provides an electromagnetic energy output 114 in at least a portion of the visible magnetic spectrum. In some implementations, the first optic subsystem 110 may provide an electromagnetic energy output 114 in at least a portion of the UV electromagnetic spectrum; at least a portion of the NIR electromagnetic spectrum, and/or at least a portion of the SWIR electromagnetic spectrum.

In some implementations, the electromagnetic energy output 114 provided by the first optic subsystem 110 may contain only a portion of the original electromagnetic spectrum received by the first optic subsystem 110. For example, the first optic subsystem 110 may receive incident electromagnetic energy 152 across the entire visible electromagnetic spectrum and may provide an electromagnetic energy output 114 in only a portion of the visible electromagnetic spectrum. In another example, the first optic subsystem 110 may receive incident electromagnetic energy 152 across all or a portion of the SWIR electromagnetic spectrum and may provide an electromagnetic energy output 114 that includes the SWIR electromagnetic spectrum rendered within at least a portion of the visible electromagnetic spectrum (e.g., a thermal imaging device). In yet another example, the first optic subsystem 110 may receive incident electromagnetic energy 152 in at least a portion of the UV spectrum and may provide an electromagnetic energy output 114 that includes the UV electromagnetic spectrum rendered within at least a portion of the visible electromagnetic spectrum. The electromagnetic energy output 114 from the first optic subsystem 110 includes at least an image of the first scene 150 in at least a portion of the visible electromagnetic spectrum.

At 1408, the electromagnetic energy output 114 from the first optic subsystem 110 impinges or otherwise illuminates a transparent photodetector subsystem 120 that includes at least a first photosensitive element array 510 disposed on a transparent substrate 512. In some implementations, the transparent photodetector subsystem 120 may be disposed at a location within the enhanced vision system that is spaced from the first optic subsystem 110. In some implementations, the transparent photodetector subsystem 120 may be disposed proximate the first optic subsystem 110. In some implementations, at least a portion of the transparent photodetector subsystem 120 may be formed, disposed, or otherwise deposited on, in, about, or across at least a portion of an exterior surface of the first optic subsystem 110.

The first photosensitive element array 510 may cover all or a portion of the transparent conductor 512. For example, in some implementations, the first photosensitive element array 510 may be disposed evenly or unevenly in, on, about, or across at least a portion of the transparent substrate 510. In other examples, all or a portion of the first photosensitive element array 510 may be disposed in, on, about, or across all or a portion of the transparent substrate 512 as an evenly or unevenly spaced array of individual photosensitive elements.

At 1410, the first photosensitive element array 510 converts at least a portion of the electromagnetic energy output 114 received from the first optic subsystem 110 to an output signal 144 that includes information and/or data representative of at least a portion of the first scene 150. Such information and/or data may include data representative of persons or objects appearing in or moving through the first scene 150. In some implementations, the transparent photodetector subsystem 120 may attenuate or otherwise reduce the amplitude and/or strength of at least a portion of the electromagnetic spectrum to obtain the output signal 144. In some implementations, the first photosensitive element array 510 may absorb only a portion of the electromagnetic spectrum of the electromagnetic energy output 114 while transmitting the remaining portion of the electromagnetic spectrum of the electromagnetic energy output 114.

In some implementations, the first photosensitive element array 510 provides an output signal that includes information and/or data that is proportional or otherwise correlative to the strength of the electromagnetic energy incident upon each individual element forming the first photosensitive element array 510. Since the visible image of the first scene 150 passes through the enhanced vision system, the availability of electronic information regarding objects and/or persons appearing in the first scene 150 facilitates an external analysis of the image data. Such is advantageous, for example, in providing information regarding identified individuals in the first scene 150 and/or objects appearing in the first scene 150. Object, structure, item, or personnel recognition information may be communicated by the image analysis circuitry 142 to the system user via any human perceptible means, including, without limitation, audio, visual, and/or tactile. For example, the image analysis circuitry 142 may identify an object classified as a threat in a particular portion of the first scene 150. In response to detecting the threat, the image analysis circuitry 142 may generate an audio output that identifies the threat, the nature of the threat, and/or the location of the threat within the first scene 150.

At 1412, the output electromagnetic energy 114 passes through the transparent photodetector subsystem 120 and exits towards the eyepiece optics where the system user is able to see the portion of the output electromagnetic energy 124 falling within the visible electromagnetic spectrum. The method 1400 concludes at 1414.

Figure 15:
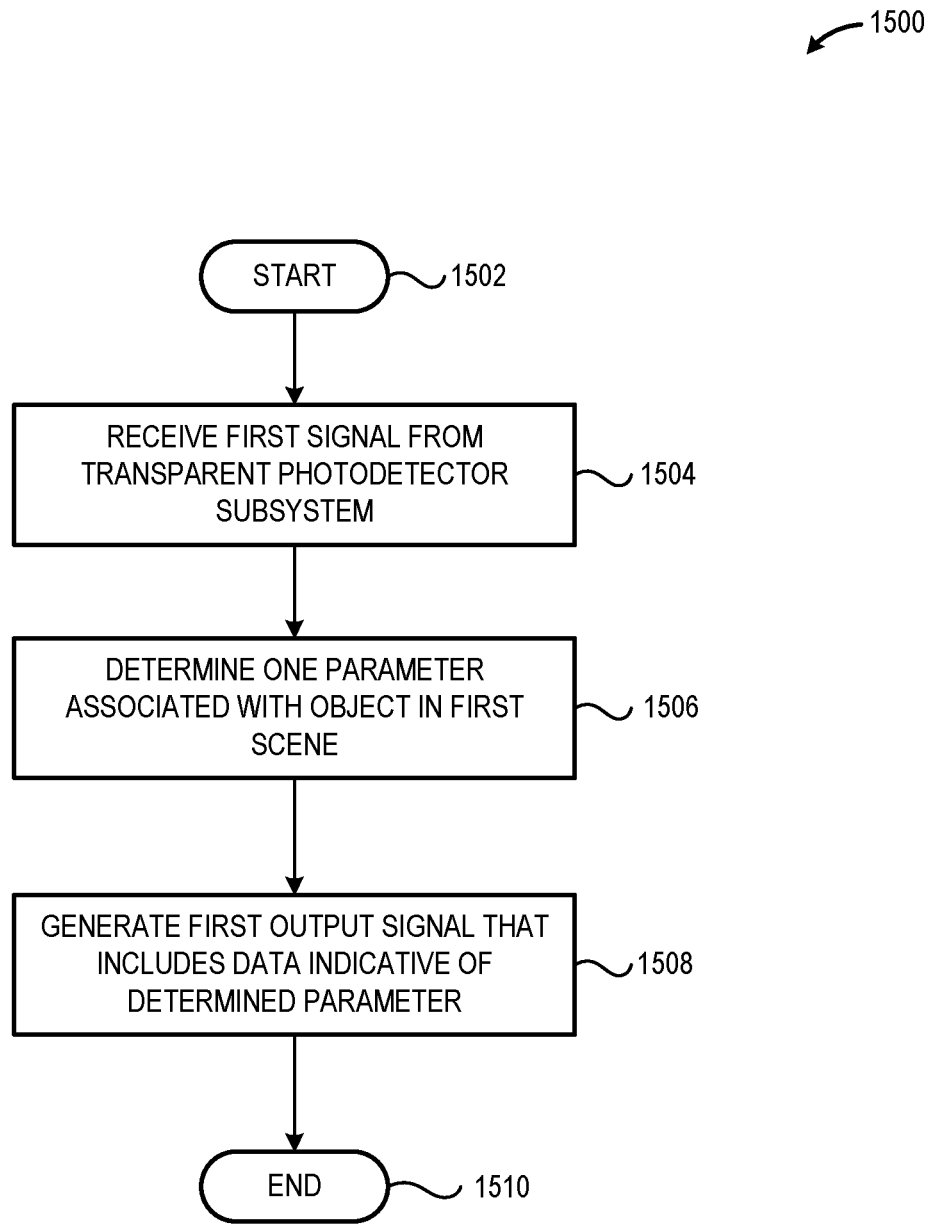
FIG. 15 depicts a high level flow diagram of an illustrative enhanced vision method, in accordance with at least one embodiment of the present disclosure described herein.

FIG. 15 is a high-level logic flow diagram of an illustrative enhanced vision method 1500, in accordance with at least one embodiment described herein. In embodiments, the enhanced vision system may include a transparent display subsystem 210 and the image analysis circuitry 142 may generate one or more display outputs that, in operation, are communicated to the transparent display subsystem 210 for display contemporaneous with the visible image of the first scene 150 provided by the output electromagnetic energy 214 from the transparent display subsystem 210. In some implementations, the image analysis circuitry 142 may align or otherwise coordinate in a known and/or defined pattern the information and/or data included in the first output signal 212 with the logically associated object(s) and/or person(s) appearing in the first image 150. In embodiments, the image analysis circuitry 142 may execute machine-readable instruction sets that cause the image analysis circuitry 142 to perform various shape and/or object recognition and/or identification for at least a portion of the objects appearing in the first scene 150. In some embodiments, the image analysis circuitry 142 may execute machine-readable instruction sets that cause the image analysis circuitry 142 to perform various biometric and/or facial recognition methods for at least a portion of the persons appearing in the first scene 150. The image analysis circuitry 142 may provide the information associated with a particular object and/or person to the system user by displaying the information on the transparent display subsystem 210 contemporaneous with the image containing the respective object and/or person. The method 1500 commences at 1502.

At 1504, the image analysis circuitry 142 receives the first output signal 144 from the transparent photodetector subsystem 120. The first output signal 144 may include information and/or data associated with some or all of the objects appearing in the first scene 150 and/or information and/or data associated with some or all of the persons appearing in the first scene 150. Such information and/or data may be representative of the image of the object or person in a visible portion of the electromagnetic spectrum, a UV portion of the electromagnetic spectrum, a NIR portion of the electromagnetic spectrum, a SWIR portion of the electromagnetic spectrum, or combinations thereof.

The transparent photodetector subsystem 120 may provide the first output signal 144 to the image analysis circuitry 142 on a continuous basis (e.g., real-time or near real-time basis), an intermittent basis, a periodic basis, or an aperiodic basis. The ability to communicate image data from the transparent photodetector subsystem 120 to the image analysis circuitry 142 on a real-time or near real-time basis beneficially permits the display of identification information or data contemporaneous with the display of the visible image of the first scene that passes through the transparent display subsystem 210.

At 1506, the image analysis circuitry 142 determines at least one parameter associated with a structure, object, and/or person appearing in the first scene 150. The at least one parameter may be a simple parameter such as one or more parameters that identify a shape of the object appearing in the first image (SQUARE, SPHERE, CUBE, etc.). The at least one parameter may be a more complex parameter such as one or more biometric parameters (facial recognition, gait, fingerprint, retinal scan, voice recognition, etc.) that uniquely identify a person of the object appearing in the first image. In embodiments, the image analysis circuitry 142 may use an on-board or local data structure to obtain information regarding the recognized object(s) and/or person(s) appearing in the first image 150. In embodiments, the image analysis circuitry 142 may use one or more network connections to access one or more remote resources that store or otherwise retain data structures to obtain information regarding the recognized object(s) and/or person(s) appearing in the first image 150.

The image analysis circuitry 142 may perform any currently available or future developed structure or object recognition method on all or a portion of the objects appearing in the first scene 150. In embodiments, the image analysis circuitry 142 may autonomously perform structure, object, or biometric recognition methods on some or all of the structures, objects, or persons appearing in the first scene 150. In embodiments, the image analysis circuitry 142 may selectively perform structure, object, or biometric recognition methods on some or all of the structures, objects, or persons appearing in the first scene 150. Such selective performance of structure, object, or biometric recognition methods may, in some instances, be performed at the request of the system user. The structure, object, or biometric recognition methods performed by the image analysis circuitry 142 generate information and/or data that may be logically associated with particular structures, objects, and/or persons appearing in the first scene 150.

In some implementations, the image analysis circuitry 142 may perform additional functions, for example, prioritizing the structures, objects, and/or persons appearing in the first scene 150. Such prioritization may, for example, include prioritizing objects as potential targets based on a quantified threat analysis score determined by the image analysis circuitry 142. Such prioritization may, for example, include prioritizing individuals in the first scene 150 based on their political or military rank or value to the enhanced vision system user.

At 1508, the image analysis circuitry 142 generates a first output signal 212 that includes the information and/or data logically associated with the structures, objects, and/or persons included in the first scene 150. In some implementations, the first output signal 212 may include one or more signals having a format displayable on the transparent display subsystem 210. The method 1500 concludes at 1510.

Figure 16:
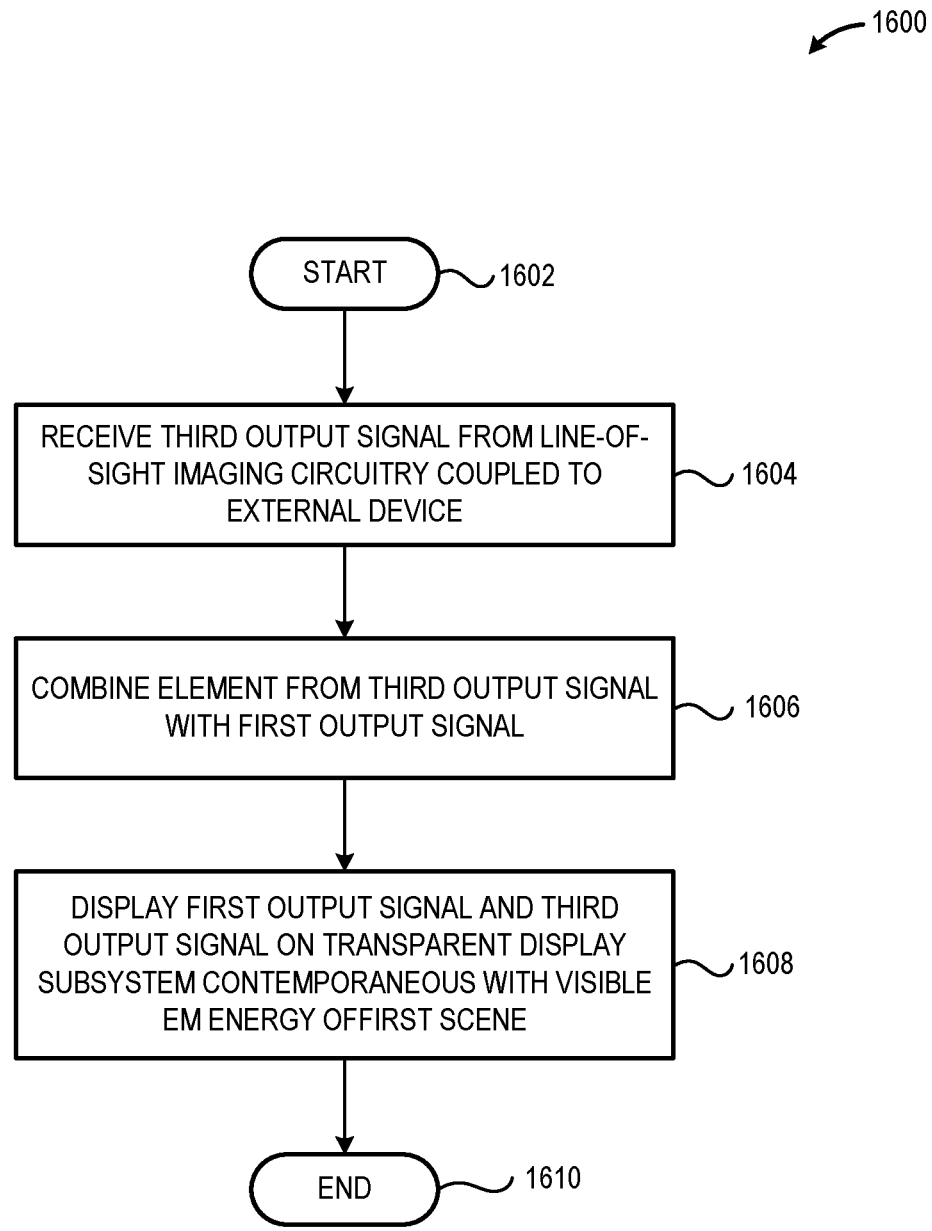
FIG. 16 depicts a high level flow diagram of an illustrative enhanced vision method, in accordance with at least one embodiment of the present disclosure described herein.

FIG. 16 is a high-level logic flow diagram of an illustrative enhanced vision method 1600, in accordance with at least one embodiment described herein. In embodiments, the enhanced vision system may be communicably coupled to line-of-sight imaging circuitry 320 that is operably coupled to an external device 330. In some implementations, the external device 330 may include one or more devices that collect or otherwise acquire information and/or data from a second scene 340. In embodiments, the second scene 340 may be different from the first scene 150. In embodiments, the second scene 340 may include all or a portion of the first scene 150. For example, the external device 330 may be operably coupled to a piece of equipment carried by the user of the enhanced vision system. Combining the information and/or data associated with the first scene 150 and the second scene 340 beneficially permits the system user to "see" the second scene 340 as "seen" by the external device. In one example implementation, the external device 330 may include a targeting scope operably coupled to a weapon system and the enhanced vision system may be used to identify potential threats in the first scene 150. In such an implementation, the enhanced vision system may be used by the system operator to see a target designator provided or otherwise generated by the external device 330. The method 1600 commences at 1602.

At 1604, the image analysis circuitry 142 receives an output signal 322 provided by the line-of-sight imaging circuitry 320 communicably coupled to an external device 330. In some implementations, the external device 330 may be operably coupled to handheld equipment. In some implementations, the output signal 322 may include information and/or data representative of the second scene 340. In some implementations, the output signal 322 may include information and/or data indicative of a line-of-sight of handheld equipment or a handheld device or a line-of-fire of a handheld weapon. In some implementations, the external device 330 may include one or more active emitters (e.g., laser sights) using one or more frequencies visible using the enhanced vision system (e.g., visible to the first optical subsystem 110 and/or the transparent photodetector subsystem 120), but otherwise invisible to the naked eye.

In some implementations, the image analysis circuitry 142 receives the output signal 322 continuously. In some implementations, the image analysis circuitry 142 selectively receives the output signal 322 at the discretion of the enhanced vision system user. In some implementations, the image analysis circuitry 142 receives the output signal 322 periodically or aperiodically. In some implementations, the image analysis circuitry 142 receives the output signal 322 via one or more wired networks, such as one or more wired personal area networks (PANs). In some implementations, the image analysis circuitry 142 receives the output signal 322 via one or more wireless networks (e.g., BLUETOOTH®, NFC, ZigBee®, INSTEON®, Z-Wave®, Wireless USB, IrDA, Body Area Network).

At 1606, the image analysis circuitry 142 combines at least a portion of the information and/or data received from the line-of-sight imaging circuitry 320 with at least a portion of the information and/or data received from the transparent photodetector subsystem 120. In some implementations, the image analysis circuitry 142 aligns or otherwise correlates the information and/or data received from the line-of-sight imaging circuitry 320 with the information and/or data received from the transparent photodetector subsystem 120. Such may, for example, permit the image analysis circuitry 142 to identify structures, objects, or individuals in the first scene 150 using information and/or data supplied via signal 144 from the transparent photodetector subsystem 120 with line-of-sight information and/or data in the second scene 340 to the extent the first scene 150 and second scene 340 overlap or share a common field-of-view. Beneficially, such a configuration facilitates the real-time or near-real time acquisition of both structure/object/individual data from the transparent photodetector subsystem 120 along with line-of-sight/targeting information from the line-of-sight imaging circuitry 320. Thus, in real-time the system user is able to benefit from the improved vision provided by the enhanced vision system and improves target acquisition accuracy from the improved line-of-sight information provided by the line-of-sight imaging circuitry 320.

At 1608, the image analysis circuitry 142 generates a display output signal that includes information communicated to the image analysis circuitry 142 from the transparent photodetector subsystem 120 with information communicated to the image analysis circuitry 142 from the line-of-sight imaging circuitry 320. In some implementations, the image analysis circuitry 142 beneficially aligns or otherwise correlates the information and/or data included in the signal 144 received from the transparent photodetector subsystem 120 with information and/or data included in the signal 322 received from the line-of-sight imaging circuitry 320. In some implementations, the image analysis circuitry 142 aligns or otherwise coordinates the display output signal 212 with the visible image transmitted through the transparent display subsystem 210 such that the information from the transparent photodetector subsystem 120 and from the line-of-sight imaging circuitry 320 align with structures, objects, and/or individuals visible in the first scene 150. The method 1600 concludes at 1610.

While FIGS. 1 through 14 are included to illustrate operations according to different embodiments, it is to be understood that not all of the operations depicted in FIGS. 1 through 14 are necessary for other embodiments. Indeed, it is fully contemplated herein that in other embodiments of the present disclosure, the operations depicted in FIGS. 1 through 14, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this con text.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. Thus, the breadth and scope of the present invention should not be limited by any of the above-described exemplary embodiments, but should be defined only in accordance with the following claims and their equivalents.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

As used in any embodiment herein, the terms "module" and/or "subsystem" may refer to hardware, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

According to example 1, there is provided an enhanced vision system. The enhanced vision system may include: a first optic subsystem that transmits a first scene within a field-of-view of the first optic subsystem in at least a visible portion of the electromagnetic spectrum; and a transparent photodetector subsystem that includes a first photosensitive element array disposed across at least a portion of a first surface of a transparent substrate, wherein the transparent photodetector subsystem is positioned with respect to the first optic subsystem such that the first photosensitive element array receives a first portion of the first scene; and wherein the transparent photodetector subsystem transmits at least a portion of the visible portion of the electromagnetic spectrum that includes at least the first portion of the first scene.

Example 2 may include elements of example 1, and may additionally include a configurable circuit communicably coupled to the transparent photodetector; and a storage device communicably coupled to the configurable circuit and containing machine-readable instructions that, when executed by the configurable circuit, transform the configurable circuit into image analysis circuitry, the image analysis circuitry to: receive a first signal that includes data representative of the first portion of the first scene from the first photosensitive element array; determine at least one parameter associated with at least one object appearing within the first scene; and generate one or more output signals that include data representative of the at least one parameter associated with the at least one object.

Example 3 may include elements of example 2, and may additionally include at least one spectral redirector, wherein the first optic subsystem is aligned along a first optical axis; wherein the transparent photodetector subsystem is aligned along a second optical axis; and wherein the spectral redirector transitions at least a portion of the electromagnetic energy emitted by the first optic subsystem in a first path parallel to the first optical axis to a second path parallel to the second optical axis.

Example 4 may include elements of example 3, and may additionally include eyepiece optics aligned along the second optical axis to output a reduced size image of the first scene along the second optical axis.

Example 5 may include elements of example 3 where the spectral redirector comprises a plurality of mirrored surfaces.

Example 6 may include elements of example 3 where the spectral redirector comprises at least one prismatic member.

Example 7 may include elements of example 2 where the first optic subsystem and the transparent photodetector subsystem are positioned along a common optical axis.

Example 8 may include elements of example 1 where the first optic subsystem transforms the spectral distribution of the first scene from a first spectral distribution incident upon the first optic subsystem to a second spectral distribution exiting the first optic subsystem, the second spectral distribution in at least the visible portion of the electromagnetic spectrum.

Example 9 may include elements of example 8 where the first optic subsystem comprises an image intensifier.

Example 10 may include elements of example 9 where the transparent photodetector subsystem is deposited across at least a portion of an exterior surface of the image intensifier.

Example 11 may include elements of example 2 where the transparent photodetector subsystem further comprises a second photosensitive element array, the second photosensitive element array positioned to capture a second scene entering the transparent photodetector subsystem from a direction opposite the first scene.

Example 12 may include elements of example 11 where the second photosensitive element array is disposed proximate at least one of: at least a portion of a second surface transversely opposed to the first surface of the transparent substrate; or at least a portion of a first surface of a second transparent substrate.

Example 13 may include elements of example 12 where the machine-readable instructions further cause the image analysis circuitry to: receive a second signal from the second photosensitive array that includes information indicative of a user eye parameter; and select at least one command for execution based at least in part on the received information indicative of the user eye parameter.

Example 14 may include elements of example 13 where the machine-readable instructions that cause the image analysis circuitry to receive a second signal that includes information indicative of a user eye parameter further cause the image analysis circuitry to: receive a second signal that includes information indicative of at least one of: a user's pupil location or a user's blink count.

Example 15 may include elements of any of examples 2 through 10 and may additionally include a transparent display subsystem communicably coupled to the image analysis circuitry, the transparent display subsystem to: receive the one or more output signals from the image analysis circuitry; generate a display output; and display, as the display output, at least a portion of the data representative of the at least one parameter associated with the at least one object such that the displayed data and the visible portion of the electromagnetic spectrum that includes at least the first portion of the first scene are aligned and contemporaneously viewable by a system user.

Example 16 may include elements of example 15 where the transparent display subsystem may include an image projector communicably coupled to the image analysis circuitry, the image projector to generate the display output; and a transparent prismatic member disposed such that: the image of the first scene visible along the second optical axis is transmitted through the transparent prismatic member; and the emitted display output internally reflects from a surface of the prismatic member and exits the prismatic member along the second optical axis.

Example 17 may include elements of example 15 where the transparent display subsystem may include an emissive transparent display device communicably coupled to the image analysis circuitry, the emissive transparent display to emit the display output and disposed such that the image of the first scene visible along the second optical axis is transmitted through at least a portion of the emissive transparent display device.

Example 18 may include elements of example 15, and may additionally include line-of-sight imaging circuitry communicably coupled via a communications interface to the image analysis circuitry; and an external device communicably coupled to the line-of-sight control circuitry, the external device to provide an output signal that includes data representative of at least a portion of a field-of-view of the external device.

Example 19 may include elements of example 18 where the communications interface comprises a wireless communications interface that communicably couples the line-of-sight control circuitry to the image analysis circuitry.

Example 20 may include elements of example 18 where the machine-readable instructions may further cause the image analysis circuitry to: receive the external device output signal from the line-of-sight control circuitry; align the data representative of the portion of the field-of-view of the operably coupled external device provided by the line-of-sight control circuitry with the image data from the first photosensitive element array; and generate a display output that includes the aligned data representative of the portion of the field-of-view of the operably coupled external device provided by the line-of-sight control circuitry with the image data from the first photosensitive element array.

According to example 21, there is provided an enhanced vision method. The method may include receiving, by a first optic subsystem, incident electromagnetic energy that includes at least a visible image of a first scene in a field-of-view of the first optic subsystem; outputting, by the first optic subsystem, electromagnetic energy in at least a visible portion of the electromagnetic spectrum, the visible electromagnetic energy output including at least a portion of the first scene; receiving, by a first photosensitive element array disposed in a transparent photodetector subsystem, at least the visible electromagnetic output from the first optic subsystem that includes at least a portion of the first scene; generating, by the first photosensitive element array, a first signal that includes information indicative of at least a portion of the first scene; and transmitting, by the transparent photodetector subsystem, at least the visible electromagnetic output from the first optic subsystem that includes at least a portion of the first scene.

Example 22 may include elements of example 21 and may additionally include receiving, at image analysis circuitry, the first signal generated by the first photosensitive element array;
determining, by the image analysis circuitry, at least one parameter associated with an object appearing in the first scene; and generating, by the image analysis circuitry, a first output signal that includes data representative of the at least one parameter associated with the object appearing in the first scene.

Example 23 may include elements of example 21 and may additionally include displaying, via eyepiece optics, a reduced size visible image that includes the portion of the first scene.

Example 24 may include elements of example 21 and may additionally include aligning the first optic subsystem with a first optical axis, wherein outputting electromagnetic energy in at least a visible portion of the electromagnetic spectrum, the visible electromagnetic energy output including at least a portion of the first scene includes: outputting, by the first optic subsystem, the visible electromagnetic energy output that includes the first scene along a path parallel to the first optical axis; redirecting, via a spectral redirector, the visible electromagnetic energy output that includes the first scene from the path parallel to the first optical axis to a path parallel to a second optical axis; and aligning the center of the transparent photodetector subsystem with the second optical axis, wherein transmitting at least the visible electromagnetic output from the first optic subsystem that includes at least a portion of the first scene includes: transmitting at least the visible electromagnetic output from the first optic subsystem that includes at least a portion of the first scene along the path parallel to the second optical axis.

Example 25 may include elements of example 24 where redirecting the visible electromagnetic energy output that includes the first scene from the path parallel to the first optical axis to a path parallel to a second optical axis may further include: redirecting, via a spectral redirector that includes a plurality of mirrored surfaces, the visible electromagnetic energy output that includes the first scene from the path parallel to the first optical axis to the path parallel to the second optical axis.

Example 26 may include elements of example 24 where redirecting the visible electromagnetic energy output that includes the first scene from the path parallel to the first optical axis to a path parallel to a second optical axis may further include redirecting, via a spectral redirector that includes at least one prismatic member, the first electromagnetic spectrum from traveling along the path parallel to first optical axis to the path parallel to the second optical axis.

Example 27 may include elements of example 21, and may additionally include aligning the first optic subsystem with a first optical axis, wherein outputting electromagnetic energy in at least a visible portion of the electromagnetic spectrum, the visible electromagnetic energy output including at least a portion of the first scene includes: outputting, by the first optic subsystem, the visible electromagnetic energy output that includes the first scene along a path parallel to the first optical axis; aligning the center of the transparent photodetector subsystem with the second optical axis, wherein transmitting at least the visible electromagnetic output from the first optic subsystem that includes at least a portion of the first scene includes: transmitting at least the visible electromagnetic output from the first optic subsystem that includes at least a portion of the first scene along the path parallel to the first optical axis.

Example 28 may include elements of example 21 where outputting electromagnetic energy in at least a visible portion of the electromagnetic spectrum, the visible electromagnetic energy output including at least a portion of the first scene may further include: outputting, by an image intensifier, electromagnetic energy in a visible second electromagnetic spectrum that includes at least the portion of the first scene.

Example 29 may include elements of example 28 where receiving, by a first photosensitive element array, at least the visible electromagnetic output from the first optic subsystem that includes at least a portion of the first scene may further include receiving, by the first photosensitive element array, at least a portion of the visible second electromagnetic output that includes at least the portion of the first scene from the image intensifier.

Example 30 may include elements of example 21, and may additionally include receiving, via a second photosensitive element array disposed on a second surface of the transparent substrate transversely opposed to the first surface of the transparent substrate, at least a first portion of an electromagnetic spectrum that includes at least a portion of a second scene incident upon the second photosensitive array from a second direction that is opposite the first scene.

Example 31 may include elements of example 30, and may additionally include generating, by the second photosensitive element array, a second output signal that includes data representative of a second scene that includes at least a portion of the system user; receiving, by the image analysis circuitry, the second output signal; determining, by the image analysis circuitry, at least one biometric parameter associated with the system user and included in the second output signal generated by the second photosensitive element array; and selecting, by the image analysis circuitry, at least one command for execution based at least in part on the determined at least one biometric parameter.

Example 32 may include elements of example 30 where generating, by the second photosensitive element array, a second output signal that includes data representative of a second scene that includes at least a portion of the system user further comprises: generating, by the second photosensitive element array, the second output signal that includes data representative of a second scene that includes at least an eye of the system user; wherein determining at least one biometric parameter associated with the system user and included in the second output signal generated by the second photosensitive element array further comprises: determining, by the image analysis circuitry, at least one of: a blink rate of the eye included in the second output signal, a pupil location of the eye included in the second output signal, or a pupil movement direction of the eye included in the second output signal.

Example 33 may include elements of any of example 22 through 29, and may additionally include receiving, by a transparent display subsystem communicably coupled to the image analysis circuitry, the first output signal generated by the image analysis circuitry;
and
generating, via the transparent display subsystem, a display output that includes at least a portion of the data included in the first output signal; displaying at least a portion of the data representative of the at least one parameter associated with the at least one object such that the displayed data and the visible portion of the electromagnetic spectrum that includes at least the first portion of the first scene are aligned and contemporaneously viewable by a system user.

Example 34 may include elements of example 33 where receiving, by a transparent display subsystem communicably coupled to the image analysis circuitry, the first output signal generated by the image analysis circuitry further comprises: receiving, by an image projector communicably coupled to the image analysis circuitry, the first output signal generated by the image analysis circuitry; projecting, by the image projector, the display output through at least one transparent prismatic member disposed such that: the image of the first scene visible along the second optical axis is transmitted through the transparent prismatic member; and the emitted display output internally reflects from a surface of the prismatic member and exits the prismatic member along the second optical axis.

Example 35 may include elements of example 33 where receiving, by a transparent display subsystem communicably coupled to the image analysis circuitry, the first output signal generated by the image analysis circuitry further comprises: an image projector communicably coupled to the image analysis circuitry, the image projector to generate the display output; and
a plurality of reflective members disposed such that: the emitted display output reflects from at least some of the plurality of reflective members and is emitted along the second optical axis.

Example 36 may include elements of example 33 where receiving, by a transparent display subsystem communicably coupled to the image analysis circuitry, the first output signal generated by the image analysis circuitry comprises: receiving, by an emissive transparent display device communicably coupled to the image analysis circuitry and disposed along the second optical axis, the first output signal generated by the image analysis circuitry; and displaying the display output contemporaneous with the visible electromagnetic output that includes at least a portion of the first scene transmitted by the transparent photodetector subsystem.

Example 37 may include elements of any of examples 22 through 29, and may additionally include receiving, at the image analysis circuitry, an output signal that includes data associated with a second scene from line-of-sight imaging circuitry communicably coupled to the image analysis circuitry and operably coupled to at least one external device; combining, by the image analysis circuitry, at least some of the data associated with the first scene included in the first signal with at least some of the data associated with the second scene included in the output signal from the line-of-sight imaging circuitry; and causing a display on the transparent display subsystem that includes the data associated with the first scene with the data associated with the second scene, wherein the combined data is displayed contemporaneously with the image of the first scene transmitted through the transparent display subsystem.

According to example 38, there is provided an enhanced vision system, The system may include: a means for receiving incident electromagnetic energy that includes at least a visible image of a first scene in a field-of-view of the first optic subsystem; a means for outputting electromagnetic energy in at least a visible portion of the electromagnetic spectrum, the visible electromagnetic energy output including at least a portion of the first scene; a means for receiving at least the visible electromagnetic output from the first optic subsystem that includes at least a portion of the first scene; a means for generating a first signal that includes information indicative of at least a portion of the first scene; and a means for transmitting at least the visible electromagnetic output from the first optic subsystem that includes at least a portion of the first scene.

Example 39 may include elements of example 38, and may additionally include a means for receiving, the first signal generated by the first photosensitive element array; a means for determining at least one parameter associated with an object appearing in the first scene; and a means for generating, a first output signal that includes data representative of the at least one parameter associated with the object appearing in the first scene.

Example 40 may include elements of example 39, and may additionally include a means for displaying a reduced size visible image that includes the portion of the first scene.

Example 41 may include elements of example 38, and may additionally include a means for aligning the first optic subsystem with a first optical axis, wherein the means for outputting electromagnetic energy in at least a visible portion of the electromagnetic spectrum, the visible electromagnetic energy output including at least a portion of the first scene further includes: a means for outputting the visible electromagnetic energy output that includes the first scene along a path parallel to the first optical axis; a means for redirecting the visible electromagnetic energy output that includes the first scene from the path parallel to the first optical axis to a path parallel to a second optical axis; and a means for aligning the center of the transparent photodetector subsystem with the second optical axis, wherein the means for transmitting at least the visible electromagnetic output from the first optic subsystem that includes at least a portion of the first scene includes: a means for transmitting at least the visible electromagnetic output from the first optic subsystem that includes at least a portion of the first scene along the path parallel to the second optical axis.

Example 42 may include elements of example 38, and may additionally include a means for aligning the first optic subsystem with a first optical axis, wherein the means for outputting electromagnetic energy in at least a visible portion of the electromagnetic spectrum, the visible electromagnetic energy output including at least a portion of the first scene includes: a means for outputting the visible electromagnetic energy output that includes the first scene along a path parallel to the first optical axis; a means for aligning the center of the transparent photodetector subsystem with the second optical axis, wherein the means for transmitting at least the visible electromagnetic output from the first optic subsystem that includes at least a portion of the first scene further includes: a means for transmitting at least the visible electromagnetic output from the first optic subsystem that includes at least a portion of the first scene along the path parallel to the first optical axis.

Example 43 may include elements of example 38 where the means for outputting electromagnetic energy in at least a visible portion of the electromagnetic spectrum, the visible electromagnetic energy output including at least a portion of the first scene further comprises: an image intensification means for outputting electromagnetic energy in a visible second electromagnetic spectrum that includes at least the portion of the first scene.

Example 44 may include elements of example 43 where the means for receiving at least the visible electromagnetic output from the first optic subsystem that includes at least a portion of the first scene may further include a means for receiving at least a portion of the visible second electromagnetic output that includes at least the portion of the first scene from the image intensification means.

Example 45 may include elements of example 38, and may additionally include a means for receiving at least a first portion of an electromagnetic spectrum that includes at least a portion of a second scene incident upon the second photosensitive array from a second direction that is opposite the first scene.

Example 46 may include elements of example 45, and may additionally include a means for generating a second output signal that includes data representative of a second scene that includes at least a portion of the system user; a means for determining at least one biometric parameter associated with the system user and included in the second output signal; and a means for selecting at least one command for execution based at least in part on the determined at least one biometric parameter.

Example 47 may include elements of example 45 where the means for generating a second output signal that includes data representative of a second scene that includes at least a portion of the system user further comprises: a means for generating the second output signal that includes data representative of a second scene that includes at least an eye of the system user; wherein the means for determining at least one biometric parameter associated with the system user and included in the second output signal generated by the second photosensitive element array further comprises: a means for determining at least one of: a blink rate of the eye included in the second output signal, a pupil location of the eye included in the second output signal, or a pupil movement direction of the eye included in the second output signal.

Example 48 may include elements of any of examples 39 through 44, and may additionally include a means for generating a display output that includes at least a portion of the data included in the first output signal; and a transparent display means for displaying at least a portion of the data representative of the at least one parameter associated with the at least one object such that the displayed data and the visible portion of the electromagnetic spectrum that includes at least the first portion of the first scene are aligned and contemporaneously viewable by a system user.

Example 49 may include elements of example 48 where the means for generating a display output that includes at least a portion of the data included in the first output signal may further include a projection means for projecting the display output through at least one transparent prismatic member disposed such that: the image of the first scene visible along the second optical axis is transmitted through the transparent prismatic member; and the emitted display output internally reflects from a surface of the prismatic member and exits the prismatic member along the second optical axis.

Example 50 may include elements of example 48 where the means for generating a display output that includes at least a portion of the data included in the first output signal may further include: a projection means for projecting the display output; and a plurality of reflective members disposed such that: the projected display output reflects from at least some of the plurality of reflective members and is emitted along the second optical axis.

Example 51 may include elements of example 48 where the means for generating a display output that includes at least a portion of the data included in the first output signal may further include an emissive transparent display means disposed along the second optical axis to provide the display output contemporaneous with the visible electromagnetic output.

Example 52 may include elements of any of examples 39 through 46, and may additionally include a means for receiving an output signal that includes data associated with a second scene from line-of-sight imaging circuitry communicably coupled to the image analysis circuitry and operably coupled to at least one external device; a means for combining at least some of the data associated with the first scene included in the first signal with at least some of the data associated with the second scene included in the output signal from the line-of-sight imaging circuitry; and a means for causing a display on the transparent display subsystem that includes the data associated with the first scene with the data associated with the second scene, wherein the combined data is displayed contemporaneously with the image of the first scene transmitted through the transparent display subsystem.

According to example 53, there is provided a storage device that includes machine-readable instructions that, when executed by a configurable circuit, cause the configurable circuit to transition to image analysis circuitry. The image analysis circuitry may: receive, from a first photosensitive element array disposed in a transparent photodetector subsystem, a first signal that includes information indicative of at least a portion of a first scene in a field-of-view of a first optic subsystem; detect at least one object included in the first scene; determine at least one parameter associated with the at least one object appearing in the first scene; and generate a display output signal that includes data representative of the at least one parameter associated with the at least one object appearing in the first scene, wherein the data representative of the at least one parameter is displayed in a defined location in a transparent display subsystem with respect to the at least one object.

Example 54 may include elements of example 53, where the machine-readable instructions may further cause the image analysis circuitry to: cause, in eyepiece optics, a real-time or near real-time display of the display output signal contemporaneous with visible electromagnetic energy exiting the first optic subsystem, the visible electromagnetic energy corresponding to a visible image of the first scene exiting the first optic subsystem.

Example 55 may include elements of example 54 where the machine-readable instructions may further cause the image analysis circuitry to: receive, from a second photosensitive element array disposed in the transparent photodetector subsystem, a second signal that includes information indicative of at least a portion of a second scene that includes at least one biological object associated with the system user; detect at least one biological object included in the second scene; determine at least one biometric parameter associated with the at least one biological object appearing in the second scene; and generate at least one input to the image analysis circuitry based on the at least one determined biometric parameter.

Example 56 may include elements of example 55 where the machine-readable instructions that cause the image analysis circuitry to receive, from a second photosensitive element array disposed in the transparent photodetector subsystem, a second signal that includes information indicative of at least a portion of a second scene that includes at least one biological object associated with the system user may further cause the image analysis circuitry to: receive, from a second photosensitive element array disposed in the transparent photodetector subsystem, a second signal that includes information indicative of at least a portion of a second scene that includes at least an eye proximate the eyepiece optics and associated with the system user.

Example 57 may include elements of example 56 where the machine-readable instructions that cause the image analysis circuitry to detect at least one biological object included in the second scene may further cause the image analysis circuitry to: detect at least one of: a pupil or an eyelid included in the second scene.

Example 58 may include elements of example 56 where the machine-readable instructions that cause the image analysis circuitry to determine at least one biometric parameter associated with the at least one biological object appearing in the second scene may further cause the image analysis circuitry to: determine at least one biometric parameter including at least one of: a pupil location of the system user; a pupil movement of the system user; or a blink rate of the system user.

Example 59 may include elements of example 53 where the machine-readable instructions may further cause the image analysis circuitry to receive, from line-of-sight imaging circuitry communicably coupled to an external device, a signal that includes data representative of a second scene within the line-of-sight of the external device; align at least a portion of the first scene with at least a portion of the second scene; and generate a display output signal that further includes data representative of at least one element provided by the external device, wherein the data representative of the at least one element provided by the external device is displayed in a defined location in the transparent display subsystem with respect to the at least one object.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. An enhanced vision system comprising:
    a first optic subsystem configured to transmit a first scene within a field-of-view in at least a visible portion of the electromagnetic spectrum; and
    a transparent photodetector subsystem configured to transmit the first scene within the field-of-view from the first optic subsystem, the transparent photodetector subsystem comprising
        a transparent substrate, and
        a first photosensitive element array on at least a portion of a first surface of the transparent substrate and configured to receive a first portion of the first scene.

2. The enhanced vision system of claim 1 further comprising:
    a configurable circuit coupled to the transparent photodetector subsystem; and
    a storage device configured to cooperate with the configurable circuit to receive a first signal representative of the first portion of the first scene from the first photosensitive element array, determine at least one parameter associated with at least one object appearing within the first scene, and generate one or more output signals representative of the at least one parameter associated with the at least one object.

3. The enhanced vision system of claim 2 wherein the first optic subsystem is aligned along a first optical axis; wherein the transparent photodetector subsystem is aligned along a second optical axis; and further comprising at least one spectral redirector configured to transition at least a portion of electromagnetic energy emitted by the first optic subsystem in a first path parallel to the first optical axis to a second path parallel to the second optical axis.

4. The enhanced vision system of claim 3 further comprising eyepiece optics aligned along the second optical axis to output a reduced size image of the first scene along the second optical axis.

5. The enhanced vision system of claim 3 wherein the at least one spectral redirector comprises at least one of: a plurality of mirrored surfaces and at least one prismatic member.

6. The enhanced vision system of claim 3 wherein the first optical axis and the second optical axis are collinear.

7. The enhanced vision system of claim 3 further comprising:

a transparent display subsystem coupled to the configurable circuit and configured to:

receive the one or more output signals; and contemporaneously display at least a portion of the one or more output signals and the first portion of the first scene aligned with each other.

8. The enhanced vision system of claim 7 further comprising:

line-of-sight circuitry coupled to the configurable circuit; and an external device coupled to the line-of-sight circuitry and configured to provide an output signal that includes at least a portion of a field-of-view of the external device.

9. The enhanced vision system of claim 7 further comprising a wireless network interface configured to receive data from one or more remote resources; wherein the received data includes data associated with the at least one object that appears in the first scene within the field-of-view of the first optic subsystem; and wherein the configurable circuit is configured to generate a display output that includes at least a portion of the received data.

10. The enhanced vision system of claim 2 wherein the transparent photodetector subsystem further comprises a second transparent substrate, and a second photosensitive element array on the second transparent substrate, the second photosensitive element array positioned to capture a second scene entering the transparent photodetector subsystem from a direction opposite the first scene.

11. The enhanced vision system of claim 10 wherein the second photosensitive element array is adjacent at least a portion of a second surface transversely opposed to the first surface of the transparent substrate; and wherein the configurable circuit is configured to:

receive a second signal from the second photosensitive element array and indicative of a user eye parameter; and select at least one command for execution based at least in part on the received second signal.

12. The enhanced vision system of claim 10 wherein the second photosensitive element array is adjacent at least a portion of a first surface of the second transparent substrate; and wherein the configurable circuit is configured to:

receive a second signal from the second photosensitive element array and indicative of a user eye parameter; and select at least one command for execution based at least in part on the received second signal.

13. The enhanced vision system of claim 2 wherein the transparent display subsystem comprises a transparent prismatic member configured to transit therethrough an image of the first scene visible along the second optical axis, and internally reflect an emitted display output from a surface of the transparent prismatic member and exiting the prismatic member along the second optical axis.

14. The enhanced vision system of claim 13 wherein the transparent display subsystem comprises an emissive transparent display device coupled to the configurable circuit and configured to emit a display output so that the image of the first scene visible along the second optical axis is transmitted through at least a portion of the emissive transparent display device.

15. The enhanced vision system of claim 1 wherein the first optic subsystem is configured to transform a spectral distribution of the first scene from a first spectral distribution incident upon the first optic subsystem to a second spectral distribution exiting the first optic subsystem, the second spectral distribution being in at least the visible portion of the electromagnetic spectrum.

16. The enhanced vision system of claim 15 wherein the first optic subsystem comprises an image intensifier.

17. The enhanced vision system of claim 16 wherein the transparent photodetector subsystem is on at least a portion of an exterior surface of the image intensifier.

18. An enhanced vision method comprising:

receiving, by a first optic subsystem, incident electromagnetic energy that includes a first scene in a field-of-view of the first optic subsystem;

outputting, by the first optic subsystem, visible electromagnetic energy including at least a portion of the first scene;

receiving, by a first photosensitive element array on a transparent substrate in a transparent photodetector subsystem, at least the visible electromagnetic energy from the first optic subsystem;

generating, by the first photosensitive element array, a first signal indicative of at least a portion of the first scene; and transmitting, by the transparent photodetector subsystem, at least the visible electromagnetic energy from the first optic subsystem that includes at least a portion of the first scene.

19. The enhanced vision method of claim 18 further comprising:

receiving, at a configurable circuit, the first signal generated by the first photosensitive element array;

determining, by the configurable circuit, at least one parameter associated with at least one object appearing in the first scene; and generating, by the configurable circuit, a first output signal representative of the at least one parameter associated with the object appearing in the first scene.

20. The enhanced vision method of claim 19 further comprising aligning the first optic subsystem with a first optical axis; wherein the outputting of the visible electromagnetic energy includes:
- outputting, by the first optic subsystem, the visible electromagnetic energy along a path parallel to the first optical axis;
- redirecting, via a spectral redirector, the visible electromagnetic energy from the path parallel to the first optical axis to a path parallel to a second optical axis; and
- aligning a center of the transparent photodetector subsystem with the second optical axis,
- wherein the transmitting of the visible electromagnetic output from the first optic subsystem includes transmitting at least the visible electromagnetic output from the first optic subsystem along the path parallel to the second optical axis.

21. The enhanced vision method of claim 20 wherein the redirecting of the visible electromagnetic energy output comprises at least one of: redirecting, via a spectral redirector that includes a plurality of mirrored surfaces; and redirecting, via the spectral redirector that includes at least one prismatic member.

22. The enhanced vision method of claim 20 further comprising aligning the first optic subsystem with a first optical axis; wherein the outputting of the visible electromagnetic energy includes:
- outputting, by the first optic subsystem, the visible electromagnetic energy output along a path parallel to the first optical axis; and
- aligning a center of the transparent photodetector subsystem with the second optical axis;
- wherein transmitting at least the visible electromagnetic output from the first optic subsystem includes transmitting at least the visible electromagnetic energy from the first optic subsystem along the path parallel to the first optical axis.

23. The enhanced vision method of claim 20 further comprising:
- receiving, by a transparent display subsystem coupled to the configurable circuit, the first output signal generated by the configurable circuit;
- generating, via the transparent display subsystem, a display output that includes at least a portion of the first output signal; and
- displaying at least a portion of the at least one parameter associated with the at least one object such that the at least the portion of the at least one parameter is aligned and contemporaneously viewable by a system user with the visible electromagnetic energy.

24. The enhanced vision method of claim 23 wherein receiving, by the transparent display subsystem coupled to the configurable circuit, the first output signal generated by the configurable circuit further comprises:
- receiving, by an image projector coupled to the configurable circuit, the first output signal generated by the configurable circuit; projecting, by the image projector, the display output through at least one transparent prismatic member such that:
  - the first scene visible along the second optical axis is transmitted through the transparent prismatic member; and
  - the display output internally reflects from a surface of the prismatic member and exits the prismatic member along the second optical axis.

25. The enhanced vision method of claim 23 wherein receiving, by the transparent display subsystem coupled to the configurable circuit, the first output signal generated by the configurable circuit further comprises:
- an image projector coupled to the configurable circuit, the image projector to generate the display output; and
- a plurality of reflective members such that the display output reflects from at least some of the plurality of reflective members and is emitted along the second optical axis.

26. The enhanced vision method of claim 23 wherein receiving, by the transparent display subsystem coupled to the configurable circuit, the first output signal generated by the configurable circuit comprises:
- receiving, by an emissive transparent display device coupled to the configurable circuit and disposed along the second optical axis, the first output signal generated by the configurable circuit; and
- displaying the display output contemporaneous with the visible electromagnetic energy that includes at least a portion of the first scene transmitted by the transparent photodetector subsystem.

27. The enhanced vision method of claim 23 further comprising:
- receiving, at the configurable circuit, an output signal associated with a second scene from line-of-sight imaging circuitry coupled to the configurable circuit and operably coupled to at least one external device;
- combining, by the configurable circuit, at least some of the first scene included in the first signal with at least some of the second scene included in the output signal from the line-of-sight imaging circuitry; and
- causing a display on the transparent display subsystem that includes the first scene combined with the second scene contemporaneously with the first scene transmitted through the transparent display subsystem.

28. The enhanced vision method of claim 19 further comprising:
- receiving, via a second photosensitive element array on a second surface of a transparent substrate transversely opposed to a first surface of the transparent substrate, at least a first portion of an electromagnetic spectrum that includes at least a portion of a second scene incident upon the second photosensitive element array from a second direction that is opposite the first scene;
- generating, by the second photosensitive element array, a second output signal representative of the second scene that includes at least a portion of a system user;
- receiving, by the configurable circuit, the second output signal;
- determining, by the configurable circuit, at least one biometric parameter associated with the system user and included in the second output signal generated by the second photosensitive element array; and
- selecting, by the configurable circuit, at least one command for execution based at least in part on the determined at least one biometric parameter.

29. The enhanced vision method of claim 18 wherein the outputting of the visible electromagnetic energy comprises outputting, by an image intensifier, electromagnetic energy in a visible second electromagnetic spectrum that includes at least the portion of the first scene.

30. The enhanced vision method of claim 29 wherein receiving, by the first photosensitive element array, at least the visible electromagnetic energy from the first optic subsystem comprises receiving, by the first photosensitive element array, at least a portion of the visible second electromagnetic output that includes at least the portion of the first scene from the image intensifier.

31. A vision system comprising:
a first optical device configured to transmit a first scene within a field-of-view in at least a visible portion of the electromagnetic spectrum;
a transparent photodetector device configured to transmit the first scene within the field-of-view from the first optical device, the transparent photodetector device comprising
   a transparent substrate, and
   a first photosensitive element array on at least a portion of a first surface of the transparent substrate and configured to receive a first portion of the first scene;
a processor coupled to the transparent photodetector device and configured to
   receive a first signal of the first portion of the first scene from the first photosensitive element array,
   determine at least one parameter associated with an object in the first scene, and
   generate at least one output signal of the at least one parameter associated with the object; and
a transparent display device coupled to the processor and configured to
   receive the at least one output signal, and
   contemporaneously display at least a portion of the at least one output signal and the first portion of the first scene aligned with each other.

* * * * *

UNITED STATES PATENT AND TRADEMARK OFFICE
CERTIFICATE OF CORRECTION

PATENT NO. : 11,410,419 B2  
APPLICATION NO. : 16/319446  
DATED : August 9, 2022  
INVENTOR(S) : Burnsed et al.

Page 1 of 1

It is certified that error appears in the above-identified patent and that said Letters Patent is hereby corrected as shown below:

On the Title Page

Item (71) Applicant, replace "Ann Arbor, MI (US)" with -- Plymouth, MI (US) --.

Item (73) Assignee, replace "L3 TECHNOLOGIES, INC. (Melbourne, FL)" with -- EOTECH, LLC Plymouth, MI (US) --.

Item (74) Attorney, Agent or Firm, replace "Allen, Dyer, Doppelt + Gilchrist, P.A. Attorneys at Law" with -- Bodman PLC --.

Signed and Sealed this  
Twenty-seventh Day of September, 2022

Katherine Kelly Vidal  
*Director of the United States Patent and Trademark Office*